(12) United States Patent
Kyo

(10) Patent No.: US 9,158,737 B2
(45) Date of Patent: Oct. 13, 2015

(54) SIMD PROCESSOR AND CONTROL PROCESSOR, AND PROCESSING ELEMENT WITH ADDRESS CALCULATING UNIT

(75) Inventor: Shorin Kyo, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 496 days.

(21) Appl. No.: 13/561,505

(22) Filed: Jul. 30, 2012

(65) Prior Publication Data

US 2013/0080739 A1    Mar. 28, 2013

(30) Foreign Application Priority Data

Sep. 26, 2011   (JP) ................................. 2011-209455

(51) Int. Cl.
| | |
|---|---|
| *G06F 12/06* | (2006.01) |
| *G06F 15/80* | (2006.01) |
| *G06F 9/30* | (2006.01) |
| *G06F 12/02* | (2006.01) |
| *G06F 9/38* | (2006.01) |

(52) U.S. Cl.
CPC .......... *G06F 15/8023* (2013.01); *G06F 9/3887* (2013.01); *G06F 12/0207* (2013.01); *G06F 12/06* (2013.01); *G06F 2212/1056* (2013.01)

(58) Field of Classification Search
CPC .............. G06F 15/8023; G06F 9/3887; G06F 12/0207; G06F 12/0223; G06F 12/06; G06F 2212/1056
See application file for complete search history.

(56) References Cited

U.S. PATENT DOCUMENTS

| 5,253,308 A * | 10/1993 | Johnson .......................... 712/11 |
| 5,532,938 A | 7/1996 | Kondo et al. |
| 6,314,505 B1 * | 11/2001 | Nakashima et al. .......... 711/217 |
| 2006/0282592 A1 * | 12/2006 | Zakriti .......................... 710/300 |
| 2007/0250688 A1 | 10/2007 | Kyou |
| 2010/0250897 A1 | 9/2010 | Gailat |

FOREIGN PATENT DOCUMENTS

| JP | 7-219919 A | 8/1995 |
| JP | 2010-531502 A | 9/2010 |
| WO | WO 2006/049331 A1 | 11/2006 |

OTHER PUBLICATIONS

Shorin Kyo et al., A Video Recognition Processor for Intelligent Cruise Control Based on 128 4-Way VLIW RISC Processing Elements, Technical Report of IEICE, The Institute of Electronics, Information, and Communication Engineers, May 2003, pp. 19-24.

* cited by examiner

*Primary Examiner* — Michael Krofcheck
(74) *Attorney, Agent, or Firm* — Foley & Lardner LLP

(57) ABSTRACT

To improve processing efficiency of a SIMD processor that divides two-dimensional data into blocks, each having a width of PE number N, to store the data in a local memory of each of PEs by a lateral direction priority method.
When designating a local address of N pieces of data arranged in a row direction from head data whose coordinate values in two-dimensional data are (X,Y) to a PE array 110, the N pieces of data being stored in local memories, a CP 150 broadcasts a local address A1, a local address A2, and a threshold number Z obtained by an address calculation unit. Each of the PEs compares a magnitude relation between the threshold number Z and its own number, and selects one of the local address A1 and the local address A2 according to the comparison result.

16 Claims, 18 Drawing Sheets

-- PRIOR ART --

-- PRIOR ART --

SIMD PROCESSOR AND CONTROL PROCESSOR, AND PROCESSING ELEMENT WITH ADDRESS CALCULATING UNIT

CROSS-REFERENCE TO RELATED APPLICATIONS

This application is based upon and claims the benefit of priority from Japanese patent application No. 2011-209455, filed on Sep. 26, 2011, the disclosure of which is incorporated herein in its entirety by reference.

BACKGROUND

The present invention relates to a Single Instruction Multiple Data (SIMD) processor.

Various techniques have been proposed regarding a SIMD processor that is able to simultaneously execute the same processing on a plurality of pieces of data by one instruction (Published Japanese Translation of PCT International Publication for Patent Application, No. 2010-531502, Japanese Unexamined Patent Application Publication No. 07-219919, International Patent Publication No. WO 2006/049331, and Shorin Kyo "In-vehicle Video Recognition LSI including 128 4-Way VLIW-type RISC core" reported by The Institute of Electronics, Information and Communication Engineers, Committee on Integrated Circuits and Devices (ICD), May, 2003, Vol. 103, No. 89, pp. 19-24: hereinafter referred to as Non-patent literature 1).

FIG. 10 schematically shows a SIMD processor disclosed in Non-patent literature 1. A SIMD processor 10 includes a control processor 20 and a processor array 30. The processor array 30 is a one-dimensionally coupled distributed memory type processor array, and includes N (N: an integer of two or larger) pieces of processor elements. These processor elements are connected in a ring shape, and perform the same processing according to an instruction from the control processor 20. When the control processor 20 sends the instruction to the processor array 30, it is possible to designate processor elements that do not execute processing by a mask bit or a mask flag (hereinafter the term "master flag" is used). Thus, the plurality of processor elements included in the processor array 30 are in one of the states in which they perform the same processing and perform no processing.

In the following description, the control processor is denoted by "CP", the processor array and the processor element are denoted by "PE array" and "PE", respectively.

Each of PEs (PE1-PEN) included in the PE array 30 has the same configuration. Thus, the PE1 will be described as a representative example. As shown in FIG. 10, the PE1 includes a local memory 44, a memory controller (MEM-CTL) 46, and a calculation unit 48.

The calculation unit 48 executes calculation, and is able to perform data communication with an adjacent PE. The MEMCTL 46 controls a local memory access and an external memory access.

The local memory access is a memory access generated inside the PE array 30, and specifically includes a write request and a read request output from the calculation unit 48. The MEMCTL 46 writes data from the calculation unit 48 according to the write request from the calculation unit 48 into the local memory 44, and reads data from the local memory 44 according to the read request from the calculation unit 48 to supply the data to the calculation unit 48.

Further, upon receiving a memory access from a device outside the PE array 30 (including the CP 20), the MEMCTL 46 writes data that is requested to be written into the local memory 44 when the memory access indicates a write access, and reads out data that is requested to be read to output the data that is read out from the local memory 44 when the memory access indicates a read access.

Such a SIMD processor 10 is especially effective for processing of a data group including a plurality of pieces of data arranged in two dimensions (hereinafter referred to as "two-dimensional data"). The two-dimensional data includes image data including data of pixels in one screen and aggregation of data input to respective cells of a two-dimensional table, and the like. In the following description, image data is used as an example of the two-dimensional data. However, it should be understood that all the description taking the image data as an example may be applied to other two-dimensional data. Further, unless otherwise stated, the terms "pixel" and the "pixel value" are used synonymously.

In typical, the width of an image (the number of pixels in the row direction) is larger than the PE number N. Thus, the SIMD processor 10 divides, as shown in FIG. 11, the image data stored in the external memory into blocks, each having a width of N and the number of rows of M (M: an integer of one or larger), stores the plurality of blocks in the local memory 44 of each of the PEs of the PE array 30, to cause each of the PEs to execute processing.

In typical, the total amount of the capacity of the local memories in the PE array 30 is greatly smaller than the capacity of the external memory. Thus, the number of blocks that may be stored in the local memories at the same time is limited. The methods for storing blocks in the local memories may include two methods of "vertical direction priority" and "lateral direction priority". Description will be made with reference to FIGS. 12 and 13.

FIG. 12 shows an example of the case of the "vertical direction priority". In FIG. 12, numbers encircled by small dotted rectangles indicate the block numbers. Further, small rectangles in the local memory 44 indicate pixels. In "A(B, C)" (A, B, C: numbers) in each of the small rectangles showing pixels, "A" indicates a block number, and "(B,C)" indicates the numbers of the column and the row in which the pixel is located in the block, respectively. For example, 1(1,1) indicates the pixel in the first column, the first row in the block 1. Note that (X,Y) coordinates of the pixel are (0,0). Further, the symbol W indicates the width of the image (the number of pixels in the X direction, i.e., the number of columns), and the symbol H indicates the height of the image (the number of pixels in the Y direction, i.e., the number of rows). The same explanation is applied also in each of the following drawings.

The storage method of the "vertical direction priority" shown in FIG. 12 is a method of simultaneously storing pixels in the same column as many as possible in the local memories of the PE array 30. In this case, blocks located on the left side are preferentially stored, and blocks located on an upper side are preferentially stored regarding each block in the same column.

In the example shown in FIG. 12, the image height H is five times larger than the number of rows M of the block. Thus, the number of rows of the block is 5. As shown in FIG. 12, the blocks 1-5 in the leftmost end (first column) in the image data in the external memory are first stored in the order of the blocks 1, 2, 3, 4, and 5, and then the blocks 6-10 which are in the second column from the left are stored in the blocks 6, 7, . . . .

Note that, regarding data in the respective blocks, N pieces of pixels in each row are stored in the same address (hereinafter referred to as a "local address") of the local memories 44 of N pieces of PEs in the order of rows. For example, regarding the block 1, the pixels (1(1,1), 1(2,1), 1(3,1), . . . , 1(N,1))

in the first row are first stored in the same local address of the local memories 44 of the PE1 to the PEN, respectively. The pixels in the second row are stored in the next local address of the local memories 44 of the same PEs as the pixels subsequent to the pixels in the same column of the first row. For example, the pixel 1(1,2) (not shown) in the first column, the second row of the block 1 is stored in the next local address of the local address of the pixel 1(1,1) in the first column, the first row in the local memory 44 of the PE1.

For example, when the base address BASEADDRESS (the address in which the pixel 1(1,1) is stored) in the local memory 44 is denoted by 0, the local address of each pixel in the first row of the block 1 is "0", and the local address of each pixel in the M-th row is "M−1". Further, the local address of each pixel in the first row of the block 2 is "M", and the local address of each pixel in the M-th row of the block 2 is "2×M−1". In the similar way, the local address which is in the first row of the block 6 is "5×M", and the local address of each pixel in the M-th row of the block 6 is "6×M−1".

FIG. 13 shows an example of a case of the "lateral direction priority". The storage method of the "lateral direction priority" is a method of simultaneously storing pixels in the same row as many as possible in the local memory of the PE array 30. According to this method, blocks located on an upper side are preferentially stored, and regarding each block in the same row, blocks located on the left side are preferentially stored.

In the example shown in FIG. 13, the image width W is four times as large as the PE number N. Thus, the number of columns of the block is four. As shown in FIG. 13, the blocks 1-4 in the uppermost row (first row) in the image data in the external memory are first stored in the order of the blocks 1, 2, 3, and 4, and the blocks 5-8 that are in the second row from the top are stored in the order of the blocks 5, 6, . . . .

Regarding the data in each block, as is similar to the case of the vertical direction priority shown in FIG. 12, N pieces of pixels in each row are stored in the same local address of the local memories 44 of N pieces of PEs in the order of rows.

In such a case in which all the pixels in the same row in an image are preferably stored in the local memories of the PE array 30 simultaneously to easily assemble the processing procedures, the storage method of the lateral direction priority shown in FIG. 13 is used. In such a case, by adjusting the number of rows M of the pixels in the block in consideration of the capacity of the local memories, all the pixels in the same row of an image may be simultaneously stored in the local memories of the PE array 30.

Consider designation of local addresses when the CP 20 causes the PE array 30 to execute processing when the pixel data is stored in the local memories of the PE array 30 in the lateral direction priority method. The one shown in FIG. 13 is used as an example of image data.

For example, as shown in FIG. 14, when the PE array 30 processes each pixel (shown in thick lines in FIG. 14) of the first row of the block 1, the CP 20 broadcasts "0" to the PE array 30 as the local address of the pixels which are to be processed. Accordingly, all the PEs are able to specify the pixels which are to be accessed by one instruction.

In the similar way, for example, as shown in FIG. 15, when the PE array 30 processes each pixel in the M-th row of the block 6, the CP 20 broadcasts "6×M−1" to the PE array 30 as the local address of the pixels which are to be processed. Accordingly, all the PEs are able to acquire the pixels which are to be accessed by one instruction.

SUMMARY

In the two examples stated above, the N pieces of pixels which are to be processed are pixels in one row in the same block. In other words, these pixels are N pieces of pixels started from the pixel having a coordinate value in an X direction of an integral multiple of N when the coordinate values of the pixel in the upper-left end of an image is (0,0).

By the way, it is not necessary that the N pieces of pixels which are to be processed start from the pixel (pixel in the first column of the block) having a coordinate value in the X direction of an integral multiple of N, but the N pieces of pixels may start from a pixel in the second or subsequent column of the block. In this case, these N pieces of pixels extend across the blocks.

For example, as shown in FIG. 16, when the N pieces of pixels start from the pixel having coordinate values of (2,4), i.e., the pixel in the first row, the third column of the block 5 (pixel 5(3, 1)), the N pieces of pixels include (N−2) pieces of pixels in the first row of the block 5 (pixels 5(3,1), 5(4,1), . . . , 5(N,1)) and the two top pixels in the first row of the block (pixels 6(1,1), 6(2,1)).

In this case, while the local address of (N−2) pixels of the block 5 is "4M", the local address of two pixels of the block 6 is "5M".

Thus, in order to make the PE1-PEN refer to the N pieces of pixels of the pixel 5(3,1) to the pixel 6(2,1), the CP 20 first designates the local address "4M" to the PE3-PEN as shown in FIG. 17, to load the pixels stored in "4M" of the local memories of these PEs in a temporary storage device 42 in each of the PEs.

Then, the CP 20 designates the local address "5M" to the PE1-PE2 as shown in FIG. 18, to load the pixels stored in "5M" of the local memories of these PEs to the temporary storage device 42 in each of the PEs.

Then the CP 20 instructs the PE array 30 to perform data exchange using inter-PE ring coupling. As shown in FIG. 19, as a result, the PE1-PEN obtain N pieces of pixels from the pixel 5(3,1) to the pixel 6(2,1), respectively.

As will be clear from the above description, in a SIMD processor that divides image data into blocks, each having a width of PE number N, to store the data in a local memory of each of the PEs by a lateral direction priority method, when N pieces of pixels started from a predetermined pixel refer to the respective N pieces of PEs, the local addresses of the N pieces of pixels are different when the coordinate value in the X direction of the predetermined pixel is not an integral multiple of N. This complicates the processing and reduces efficiency.

A first aspect of the present invention is a control processor in a SIMD processor. The SIMD processor includes N (N: an integer of two or larger) pieces of processor elements which are connected in a ring shape and to which numbers are sequentially assigned, and the control processor which controls the N pieces of processor elements. Two-dimensional data having a width of W (W: an integral multiple of N) larger than N is divided into blocks, each block having a width of N and the number of rows of M (M: an integer of one or larger). The SIMD processor transfers the two-dimensional data to local memories from an external memory in such a way that blocks located on an upper side being preferentially transferred, and N pieces of data in the same row in the same block are to be stored in the same local address of the respective local memories of the N pieces of processor elements.

The control processor includes an address calculation unit, and when designating the local address of the N pieces of data aligned in a row direction from head data having coordinate values in the two-dimensional data of (X,Y) to the N pieces of processor elements, the N pieces of data being stored in the local memories, the control processor broadcasts a local address A1, a local address A2, and a threshold number Z calculated by the address calculation unit to the N pieces of processor elements.

The local address A1 and the local address A2 may be the local address of the N pieces of data, and the threshold number Z is a threshold of the number of the processor element which serves as a standard to select any one of the two local addresses. The address calculation unit calculates the local addresses A1 and A2, and the threshold number Z based on X, Y, M, W, and N.

A second aspect of the present invention is processor elements in the SIMD processor described above. Each of the processor elements includes an address selector that compares, upon receiving a local address A1, a local address A2, and a threshold number Z broadcasted from a control processor in the SIMD processor, a magnitude relation of the threshold number Z and its own number and selects one of the local address A1 and the local address A2 according to the comparison result.

A third aspect of the present invention is a SIMD processor. A control processor and processor elements in the SIMD processor are the control processor and the processor elements described above as the aspects of the present invention.

A method, an apparatus, a system and the like obtained by replacing the control processor, the processor elements, and the SIMD processor of the above aspect, a program for causing a computer to execute these methods and the like may be effective as an aspect of the present invention.

According to the technique of the present invention, it is possible to improve processing efficiency of a SIMD processor that divides image data into blocks, each having a width of PE number N, to store the data in a local memory of each of PEs by a lateral direction priority method.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
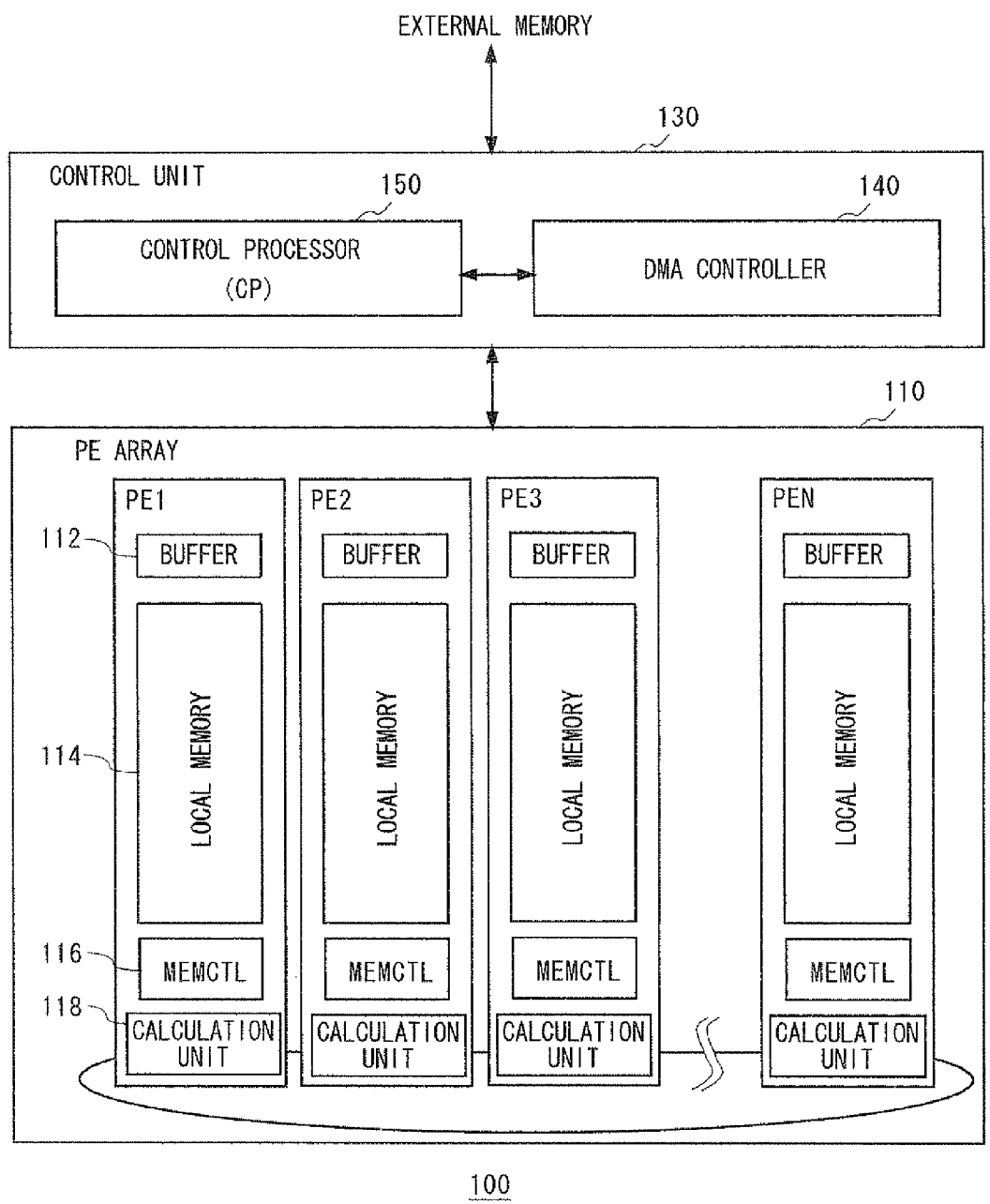
FIG. 1 is a diagram showing a SIMD processor according to a first embodiment of the present invention.

Hereinafter, embodiments of the present invention will be described with reference to the drawings. For the sake of clarification of description, the following description and the drawings are partially omitted and simplified as appropriate. Further, a person skilled in the art would understand that each element described in the drawings as a functional block performing various processing may be achieved in various ways according to the combination of hardware and software (program), and it is not limited to any one of hardware and software. Throughout the drawings, the same elements are denoted by the same reference symbols, and the overlapping description will be omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

FIG. 1 shows a SIMD processor 100 according to a first embodiment of the present invention. The SIMD processor 100 includes a PE array 110 and a control unit 130.

The PE array 110 includes N (N: an integer of two or larger) pieces of processor elements (PEs). These PEs are connected in a ring shape, and are sequentially assigned with numbers. In the example shown in FIG. 1, these PEs are numbered from 1 to N. Hereinafter, the number assigned to each of the PEs is denoted by a PE number. Since each of the PEs has the same configuration, the PE1 will be described here as a representative example.

The PE1 includes a buffer 112 that temporarily stores data communicated with an external memory, a local memory 114, a memory controller (MEMCTL) 116, and a calculation unit 118.

The MEMCTL 116 includes a function of a memory controller typically included in this type of PE. For example, when performing data communication with the external memory, the MEMCTL 116 reads out corresponding data from the local memory 114 according to a read instruction from a control processor (CP) 150 described later in the control unit 130 to store the data in the buffer 112, or reads out data stored in the buffer 112 according to a write instruction from the CP 150 to write the data into the corresponding address of the local memory 114.

In the first embodiment, the MEMCTL 116 further includes an address selection function. This will be described later.

The calculation unit 118 includes the similar function as a calculation unit typically included in this type of PE, and the detailed description thereof will be omitted.

The control unit 130 includes a direct memory access (DMA) controller 140 and the CP 150. The CP 150 controls the PE array 110 and the DMA controller 140.

Upon receiving an instruction of data transfer (hereinafter simply referred to as a transfer instruction) from the CP 150, the DMA controller 140 performs DMA transfer of data that is communicated between the external memory and each of the PEs of the PE array 110. Specifically, when data transfer from the external memory to the local memory 114 of each of the PEs is instructed, the DMA controller 140 transfers corresponding data from the external memory to the buffer 112 of each of the PEs. When data transfer from the local memory 114 to the external memory is instructed, the DMA controller 140 transfers the data stored in each of the buffers 112 to the external memory.

The SIND processor 100 according to the first embodiment is able to transfer two-dimensional data (hereinafter "image data" is taken as an example) stored in the external memory to the local memories 114 in a lateral direction priority method. As described above, according to the lateral direction priority method, the image data is divided into blocks, each having a width of N (the number of PEs) and the number of rows of M (M: an integer of one or larger), and the image data is transferred to the local memory buffers 112 from the external memory in such a way that blocks located on an upper side are preferentially transferred, and N pieces of data in the same row in the same block are to be stored in the same local address of the respective local memories of the N pieces of processor elements.

Such transfer and storage in each of the local memories are performed by the CP 150 and the MEMCTL 116 of each of the PEs according to the instruction from the CP 150.

Further, in the first embodiment, it is assumed that the width (the number of pixels in one row) of the image data to be transferred from the external memory to the buffer 112 is W (W: an integral multiple of N) larger than N.

In the following description, it is assumed that a part of the image data stored in the external memory has already been transferred to the PE array 110 by the lateral direction priority method through the buffer 112 by the DMA controller 140 and the MEMCTL 116 of each of the PEs, and stored in each of the local memories 114.

Figure 2:
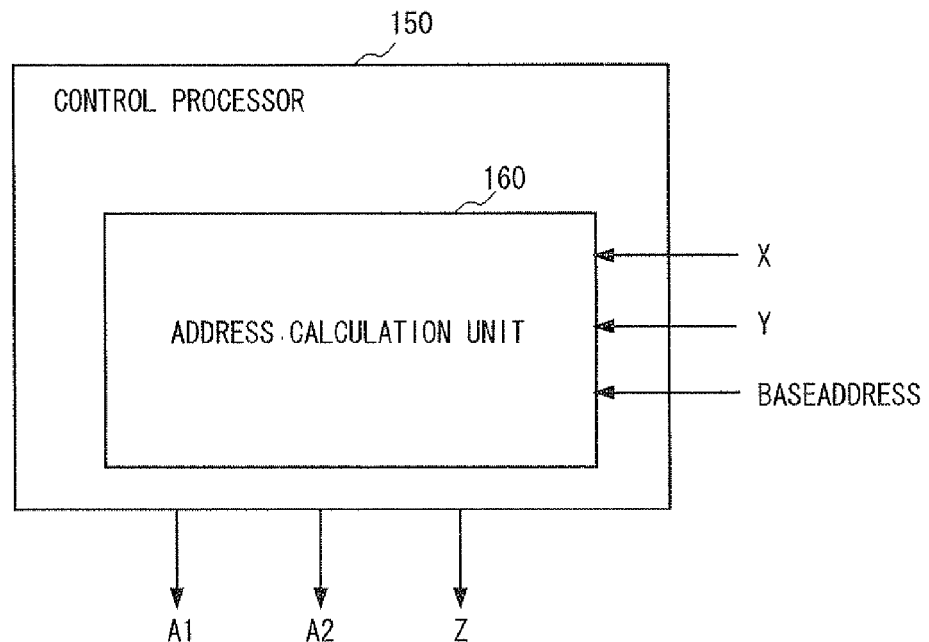
FIG. 2 is a diagram showing a control processor (CP) in the SIMD processor shown in FIG. 1.

FIG. 2 is a diagram showing the CP 150. As shown in FIG. 2, the CP 150 includes an address calculation unit 160. The address calculation unit 160 obtains a local address A1 and a local address A2 which are addresses (local addresses) on the local memory 114, and a threshold number Z. The CP 150 simultaneously broadcasts the local address A1, the local address A2, and the threshold number Z obtained by the address calculation unit 160 to each of the PEs of the PE array 110 when designating a local address of N pieces of data arranged in a row direction from head data whose coordinate value in the image data is (X,Y) to the PE array 110, the N pieces of data being stored in the local memory 114 of each of the PEs.

The local address A1 and the local address A2 may be the local address of the N pieces of data described above, and the threshold number Z is a threshold of the number of the processor element which serves as a standard to select any one of the two local addresses. The address calculation unit 160 calculates the local addresses A1 and A2, and the threshold number Z based on X, Y, M, W, and N.

More specifically, for example, when coordinate values of the pixel in the upper-left end of the image data are (0,0), the address calculation unit 160 calculates the local address A1, the local address A2, and the threshold number Z according to the following expressions (1)-(3).

$$A1 = \text{BASEADDRESS} + \text{floor}(Y/M) \times (M \times W/N) + \text{floor}(X/N) \times M + Y \% M \quad (1)$$

$$A2 = \text{BASEADDRESS} + \text{floor}(Y/M) \times (M \times W/N) + \text{floor}(X/N) \times M + Y \% M + M \quad (2)$$

$$Z = X \% N \quad (3)$$

where
X: an X direction coordinate value of the head data
Y: a Y direction coordinate value of the head data
N: the number of processor elements
W: a width of the two-dimensional data
M: the number of rows in the block Now, functions and calculation symbols used in the expression (1), the expression (2), and the following description will be collectively described.

The symbol floor( ) is a floor function for obtaining an integer part of the value in the parentheses.

The symbol "/" indicates division of the value on the left side and the value on the right side. For example, "Y/M" means division of Y and M. Further, the symbol "×" indicates multiplication of the value on the left side and the value on the right side.

The symbol "%" indicates a remainder obtained by dividing the value on the left side by the value on the right side. For example, "Y % M" indicates a remainder obtained by dividing Y by M.

The symbol ">>" indicates a bit operation for arithmetically shifting the value on the left side to the right by the amount corresponding to the digits indicated by the value on the right side. For example, "A>>B" indicates a bit operation for arithmetically shifting A to the right by B digits.

The symbol "<<" indicates a bit operation for arithmetically shifting the value on the left side to the left by the amount corresponding to the digits indicated by the value on the right side. For example, "A<<B" indicates a bit operation for arithmetically shifting A to the left by B digits.

Now, the address selection function of each of the PEs will be described first, and then the meaning of the local address A1, the local address A2, and the threshold number Z will be described next.

Figure 3:
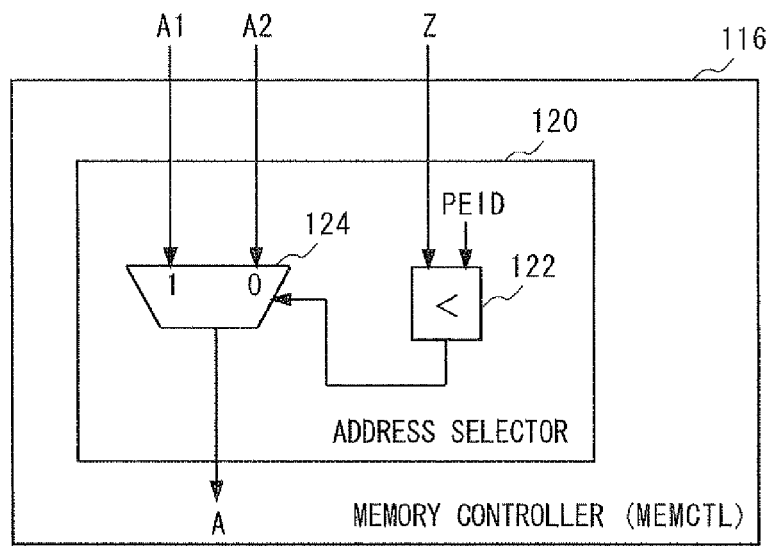
FIG. 3 is a diagram showing a memory controller (MEM-CTL) of a PE in the SIMD processor shown in FIG. 1.

FIG. 3 shows the MEMCTL 116. As shown in FIG. 3, the MEMCTL 116 includes an address selector 120. The address selector 120 selects the local address A which should be used in the PE to which the address selector 120 belongs from the local address A1 and the local address A2 broadcasted from the CP 150, and this selection is performed based on the threshold number Z broadcasted by the CP 150.

As shown in FIG. 3, the address selector 120 includes a comparator 122 and a demultiplexer 124. The comparator 122 receives a PE number (PEID in FIG. 3) and the threshold number Z, and compares PEID with the threshold number Z, to output the comparison result to the demultiplexer 124.

The demultiplexer 124 has two inputs and one output, and selects one of the two inputs (local address A1, local address A2) as the local address A which is the output according to the comparison result from the comparator 122.

According to the configuration stated above, the address selector 120 selects the local address A1 as the local address A when the number of the PE to which the address selector 120 belongs is larger than the threshold number Z, and selects the local address A2 as the local address A when the number of the PE is equal to or smaller than the threshold number Z.

With reference to specific examples shown in FIGS. 14-16, operations of the related functional blocks when the local address of N pieces of pixels started from the head data whose coordinate values are (X,Y) are designated to the PE array 110 in the SIMD processor 100 will be described. It is assumed here that "W/N" is "4".

Figure 14:
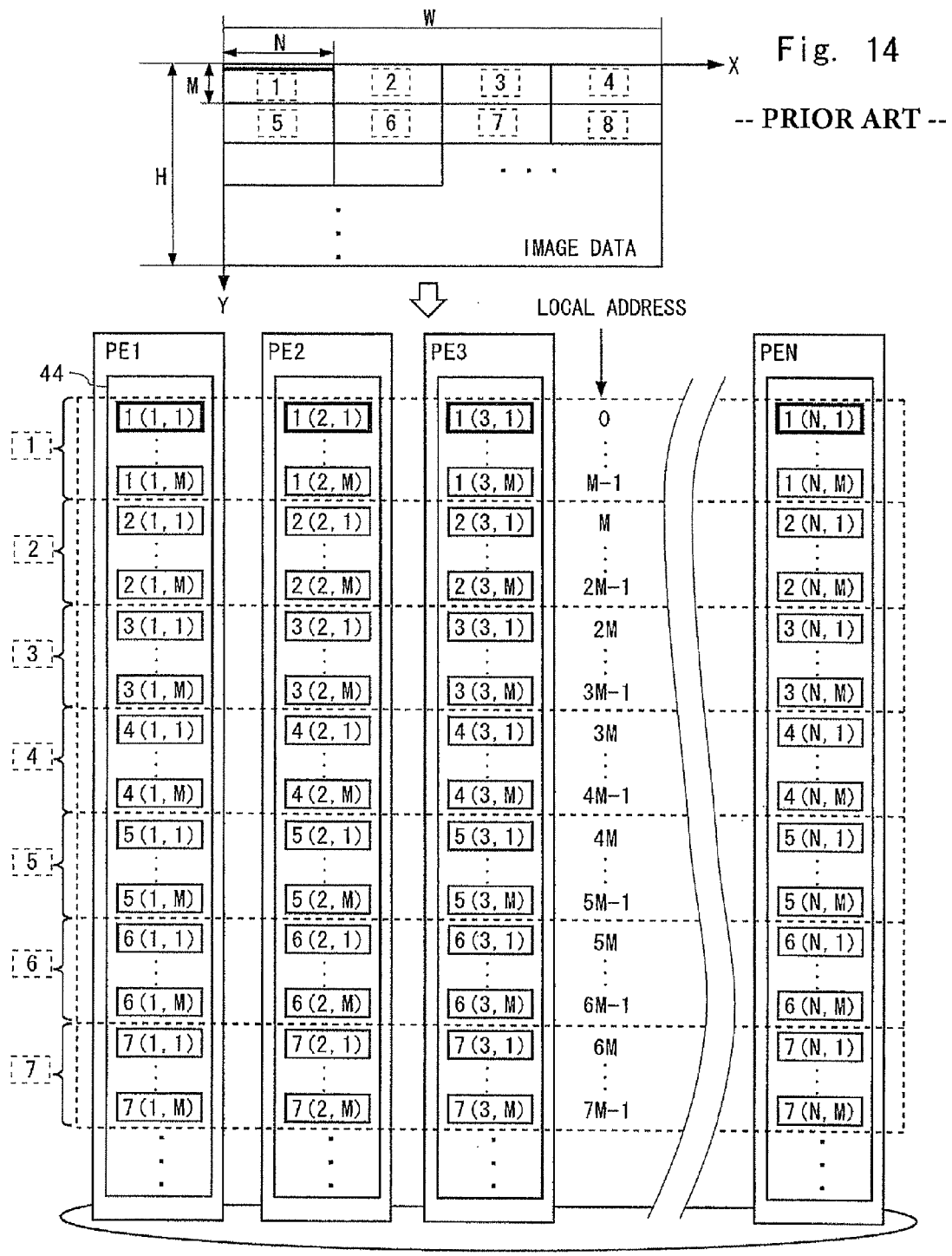
FIG. 14 is a diagram showing an example of a local address of N pieces of pixels which are to be processed in the storage method shown in FIG. 13 (case 1)
Figure 15:
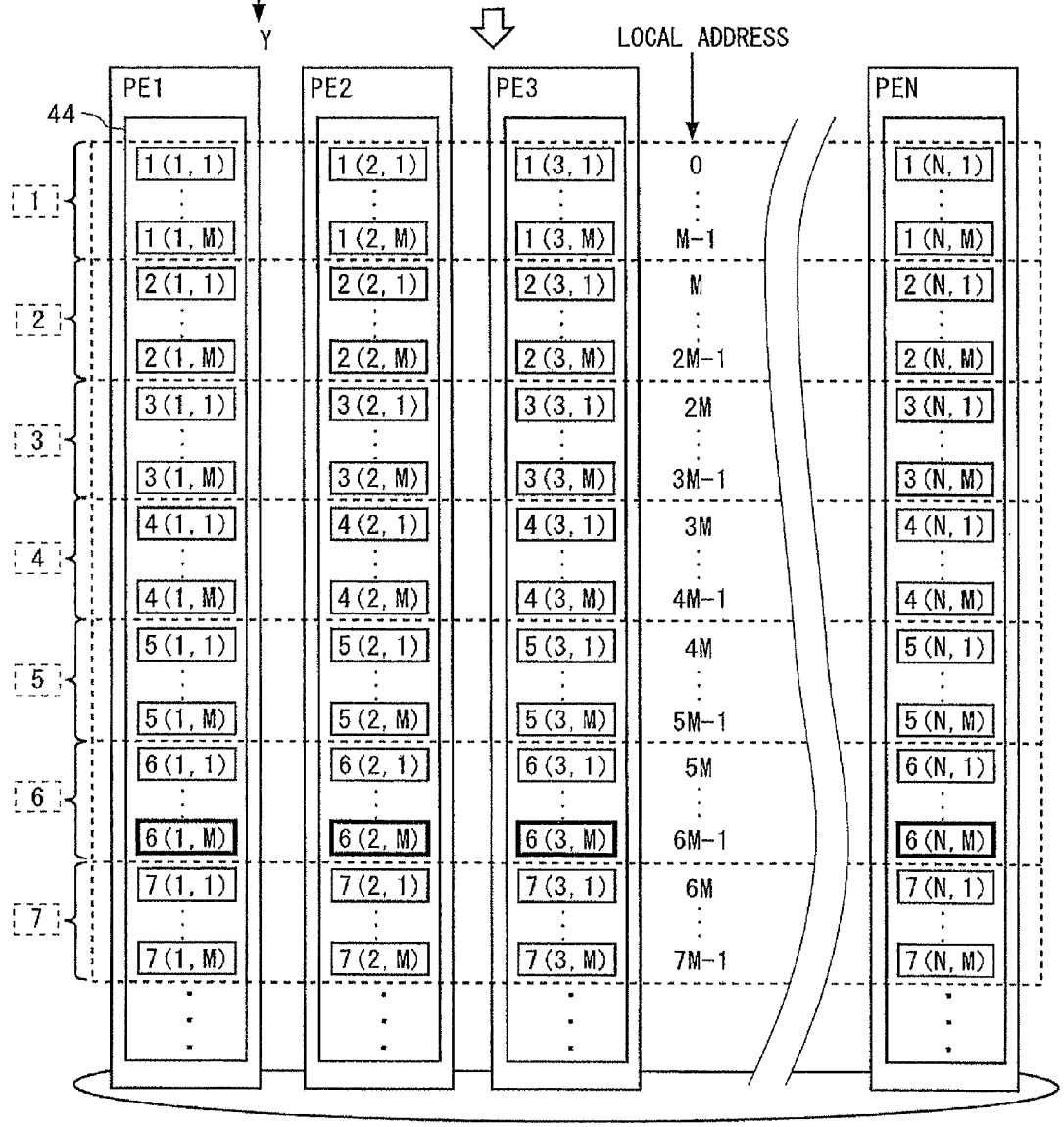
FIG. 15 is a diagram showing an example of a local address of N pieces of pixels which are to be processed in the storage method shown in FIG. 13 (case 2)
Figure 16:
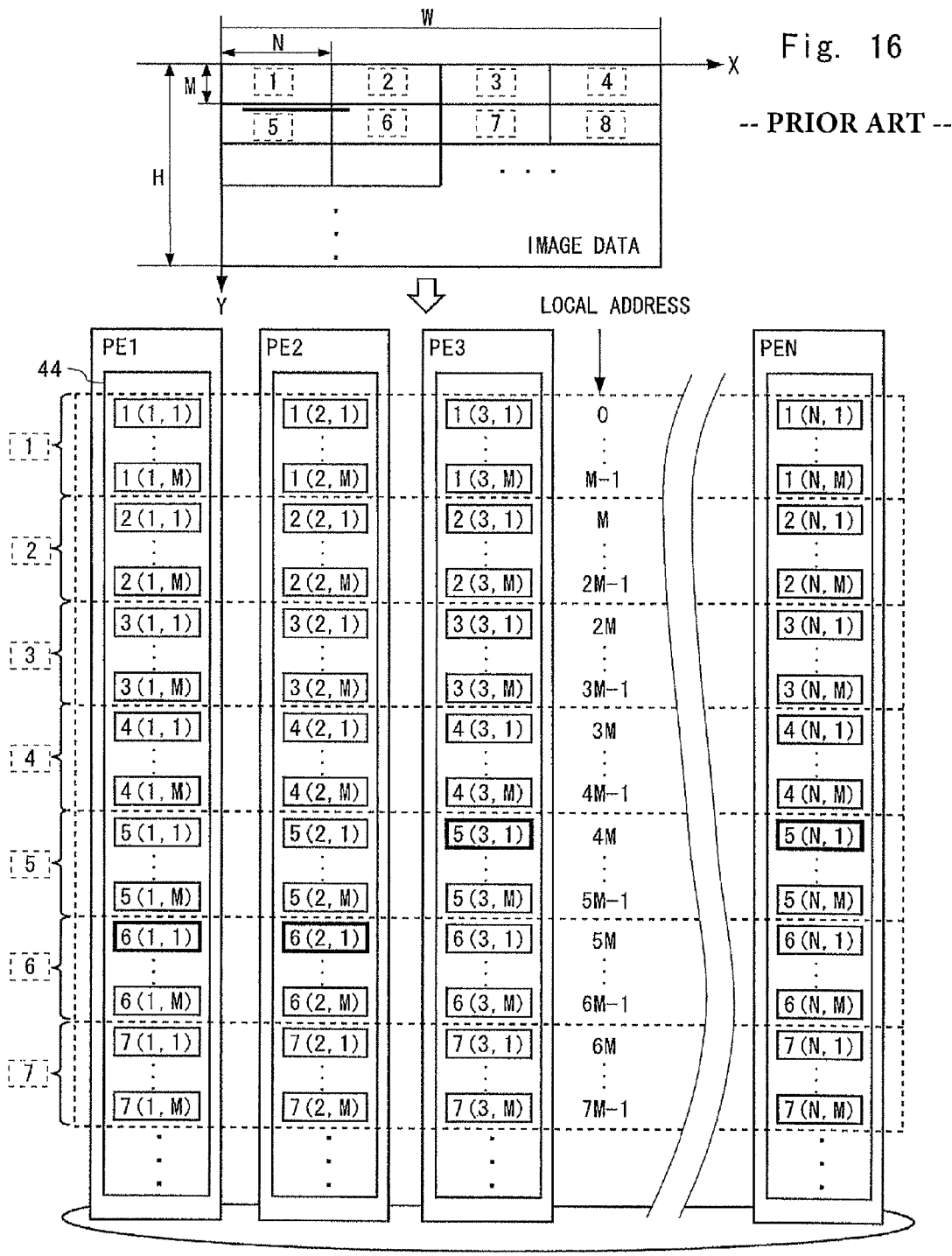
FIG. 16 is a diagram showing an example of local addresses of N pieces of pixels which are to be processed in the storage method shown in FIG. 13 (case 3)
Figure 17:
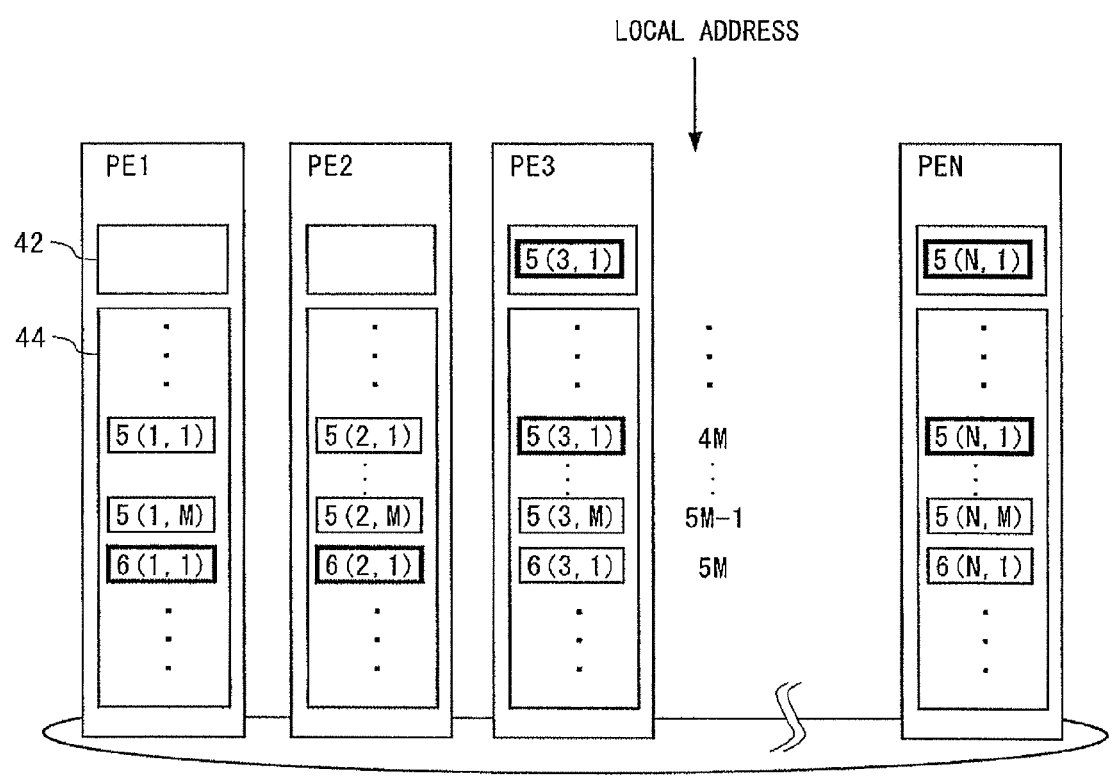
FIG. 17 is a diagram for describing a procedure for processing the SIND processor in the case shown in FIG. 16 (case 1)
Figure 18:
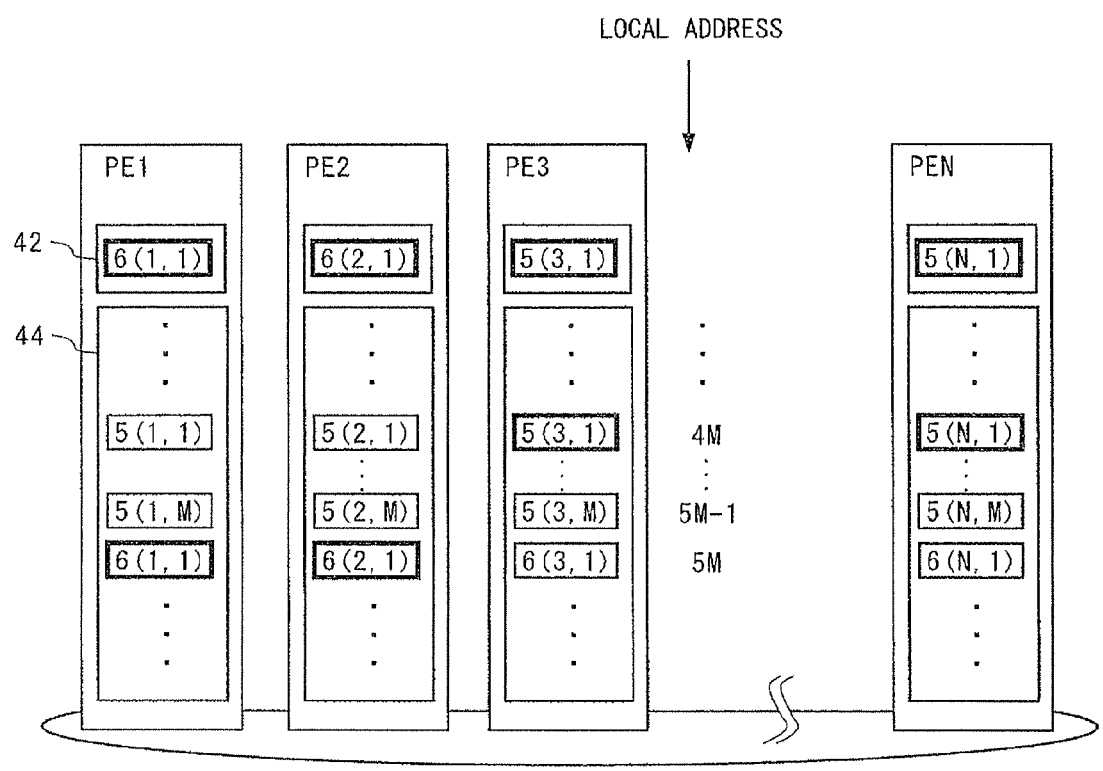
FIG. 18 is a diagram for describing a procedure for processing the SIMD processor in the case shown in FIG. 16 (case 2)
Figure 19:
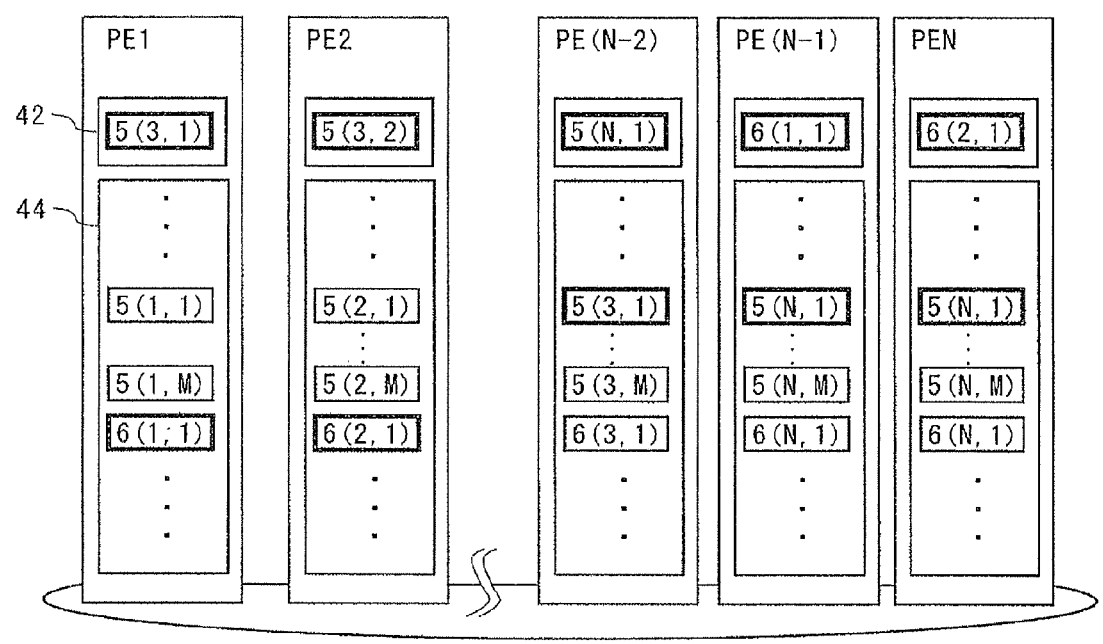
FIG. 19 is a diagram for describing a procedure for processing the SIMD processor in the case shown in FIG. 16 (case 3).

FIGS. 14-16 show each local address assuming a case in which the base address BASEADDRESS is 0. Thus, when the base address BASEADDRESS is not 0, each local address shown in the drawings becomes a value obtained by adding the base address BASEADDRESS to the shown value. In the following description, "BASEADDRESS" may be abbreviated as "BASE".

The example shown in FIG. 14 is a case in which the local address of N pieces of pixels in the first row of the block 1 is designated to the PE array 110. In this case, since X and Y (i.e., coordinate values of the head data) in the expressions (1)-(3) are both "0", the local address A1, the local address A2, and the threshold number Z calculated by the address calculation unit 160 in the CP 150 of the SIMD processor 100 are "BASE", "BASE+M", and "0".

Upon receiving A1, A2, and Z that are simultaneously broadcasted, the address selector 120 in the MEMCTL 116 of each of the PEs of the PE array 110 compares Z with the PE number of the PE to which the address selector 120 belongs. For example, since the PE number of the PE1 is "1" and the threshold number Z is larger than "0", the address selector 120 of the PE1 selects the local address A1 (base address BASE) as the local address A used by the PE1.

The address selector 120 of each of the PE2-PEN selects the local address A1 (base address BASE) as the local address A in the similar way.

As a result, data stored in the base address BASE of the local memory of each of the PE1-PEN, i.e., the data in the first row of the block 1 is specified.

The example shown in FIG. 15 is a case in which the local address of N pieces of pixels in the M-th row of the block 6 is designated to the PE array 110. In this case, X and Y in the expressions (1)-(3) are "N" and "2M−1", respectively. Thus, the local address A1, the local address A2, and the threshold number Z calculated by the address calculation unit 160 in the CP 150 of the SIMD processor 100 are "base address BASE+(6M−1)", "base address BASE+(7M−1)", and "0", respectively.

Each of the PE numbers of the PE1-PEN is larger than the threshold number Z which is "0". Thus, upon receiving A1, A2, and Z that are broadcasted simultaneously, the address selector 120 in the MEMCTL 116 of each of the PEs of the PE array 110 selects the local address A1 as the local address A.

As a result, the data stored in the "base address BASE+ (6M−1)" of the local memory of each of the PE1-PEN, i.e., the data in the M-th row of the block 6 is specified.

In summary, according to the SIMM processor 100 of the first embodiment, designation of N pieces of data to the PE array 110, the N pieces of data being started from the head data whose coordinate value in the X direction is an integral multiple of N, may be achieved by broadcasting once the local address A1, the local address A2, and the threshold number Z simultaneously.

With reference to FIG. 16, a case will be described in which N pieces of data started from the head data whose coordinate value in the X direction is not an integral multiple of N are designated to the PE array 110.

The example shown in FIG. 16 is a case in which the local addresses of N pieces of pixels (pixels 5(3,1), 5(4,1), . . . , 5(N,1), 6(1,1), 6(2,1)) started from the pixel in the third column of the first row of the block 5 (pixel 5(3,1)) are designated to the PE array 110. In this case, X and Y in the expression (1)-expression (3) are "2" and "M", respectively. Accordingly, the local address A1, the local address A2, and the threshold number Z calculated by the address calculation unit 160 in the CP 150 of the SIMD processor 100 are "base address BASE+4M", "base address BASE+5M", and "2", respectively.

Since each of the PE numbers of the PE1 and the PE2 is equal to or smaller than the threshold number Z (2), the address selector 120 in each of these two PEs selects the local address A2 as the local address A.

On the other hand, since each of the PE numbers of the PE3-PEN is larger than the threshold number Z, the address selector 120 in each of these PEs selects the local address A1 as the local address A.

As a result, data stored in the "base address BASE+5M" of the local memory of each of the PE1-PE2, i.e., data in the first column and the second column of the first row of the block 6, and data stored in the "base address BASE+4M" of the local memory of each of the PE3-PEN, i.e., data in the third column to the N-th column of the first row of the block 5 are specified.

In summary, according to the SIMD processor 100 according to the first embodiment, designation of N pieces of data to the PE array 100, the N pieces of data being started from the head data whose coordinate value in the X direction is not an integral multiple of N, may be achieved by broadcasting once the local address A1, the local address A2, and the threshold number Z simultaneously.

As described above, in the SIMD processor 100 that divides the image data into blocks to store the divided image data in the local memory of each of the PEs by the lateral direction priority method, the CP 150 simultaneously broadcasts the local address A1, the local address A2, and the threshold number Z calculated by the address selector 120 of each of the PEs, and the address selector 120 in each of the PEs selects one of the local address A1 and the local address A2 as the local address A according to the result obtained by comparing the threshold number Z with the PE number of the address selector 120. Accordingly, it is possible to designate N pieces of data started from the head data to the PE array 110 by one instruction regardless of whether the X-direction coordinate value of the head data is an integer of N, thereby making it possible to improve processing efficiency of the whole SIMD processor 100.

Note that, in the SIMD processor 100, the PE numbers from 1 to N are assigned to the PEs in the PE array 110, the address selector 120 selects the local address A1 when the PE number is larger than the threshold number Z, and selects the local address A2 when the PE number is equal to or smaller than the threshold number Z. For example, when the PE numbers of 0–(N–1) are assigned to the PEs of the PE array 110, the address selector 120 may select the local address A1 when the PE number is equal to or larger than the threshold number Z, and select the local address A2 when the PE number is smaller than the threshold number Z.

Second Embodiment

The CP 150 in the SIMD processor 100 according to the first embodiment obtains the local address A1, the local address A2, and the normal threshold number Z by performing calculations of the expressions (1)-(3). Since the control processor only includes a set of instructions similar to that included in a general-purpose processor in general, a large number of processing cycles are required to execute calculations of the expressions (1) and (2), which may eventually cause large overhead. A technique for suppressing the overhead by modifying the address calculation unit 160 in the CP 150 will be described using a second embodiment.

The second embodiment of the present invention is also a SIMD processor. The SIMD processor is the same to the SIMD processor 100 except the following two points. Accordingly, only the difference between the SIMD processor 100 and the SIMD processor of the second embodiment will be described.

(1) The PE number N in the SIMD processor is limited to a power of 2, and the number of rows M in a block is also limited to a power of 2.

Figure 4:
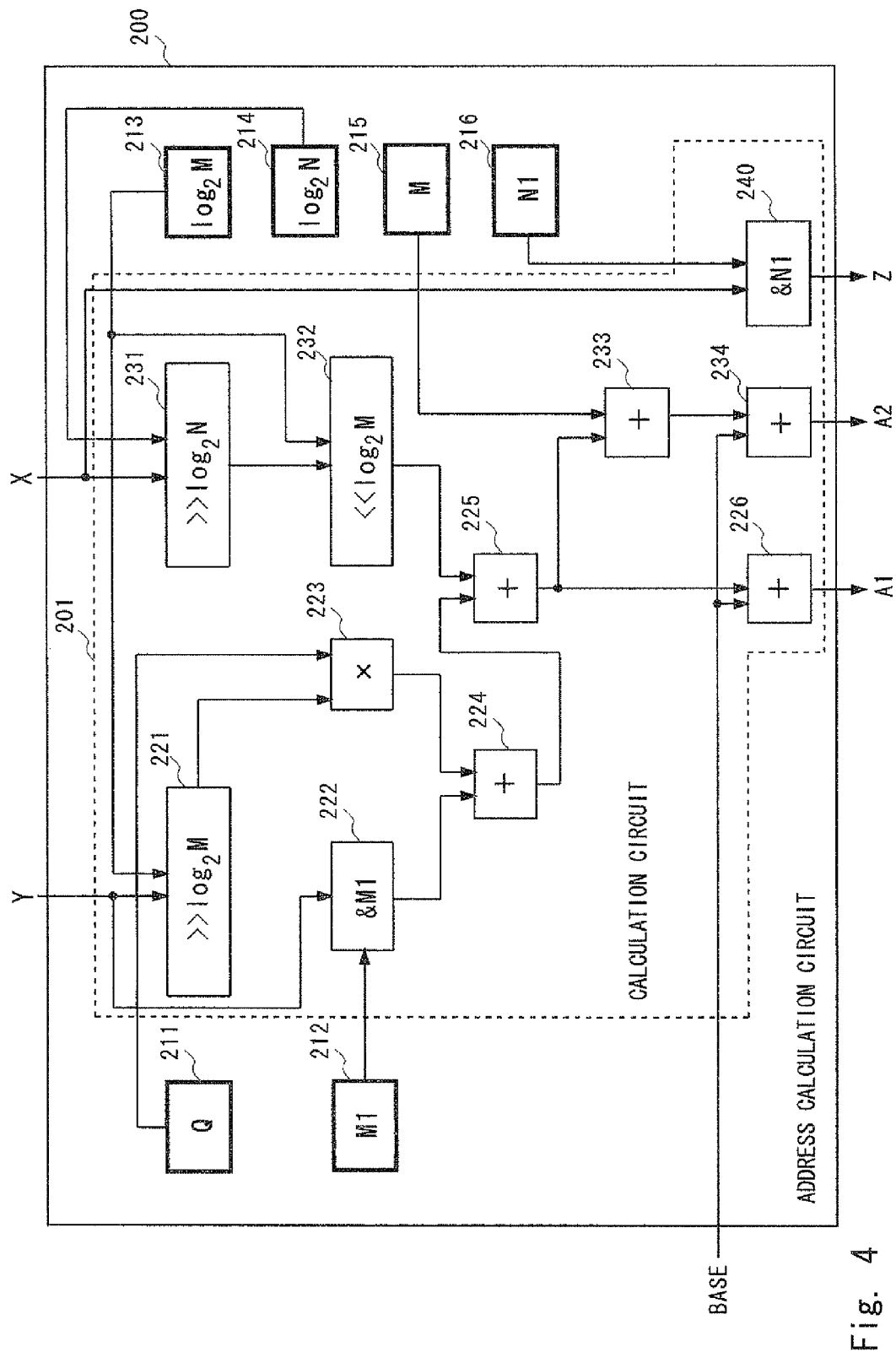
FIG. 4 is a diagram showing an address calculation unit in a SIMD processor according to a second embodiment of the present invention.

(2) In the CP 150, an address calculation unit 200 shown in FIG. 4 is provided in place of the address calculation unit 160.

As shown in FIG. 4, the address calculation unit 200 includes a calculation circuit 201, and a parameter storage unit including a plurality of storage units other than the calculation circuit 201, as shown by a thick line frame.

Specifically, the parameter storage unit includes a storage unit 211 that stores Q which is "(W>>log 2N)<<log 2M", a storage unit 212 that stores M1 (=(M–1)) obtained by subtracting 1 from the number of rows M of a block, a storage unit 213 that stores $\log_2 M$, a storage unit 214 that stores $\log_2 N$, a storage unit 215 that stores M, and a storage unit 216 that stores N1 which is "N–1". Since each of M and N is a power of 2, $\log_2 M$ and $\log_2 N$ are integers.

The calculation circuit 201 calculates the local address A1, the local address A2, and the threshold number Z using a parameter stored in each storage unit described above.

As shown in FIG. 4, the calculation circuit 201 includes an arithmetic shift circuit 221, a logical AND circuit 222, a multiplier 223, an adder 224, an adder 225, an adder 226, an arithmetic shift circuit 231, an arithmetic shift circuit 232, an adder 233, an adder 234, and a logical AND circuit 240.

The arithmetic shift circuit 221 receives Y (Y coordinate value of the head data) and $\log_2 M$ output from the storage unit 213. The arithmetic shift circuit 221 arithmetically shifts Y to the right by $\log_2 M$ digits, to output the result to the multiplier 223.

The multiplier 223 multiplies the output from the arithmetic shift circuit 221 by Q output from the storage unit 211, to output the result to the adder 224.

The logical AND circuit 222 receives Y and M1 output from the storage unit 212. The logical AND circuit 222 performs logical AND operation for each bit on Y and M1 with respect to the bit to output the result to the adder 224. The operation executed by the logical AND circuit 222 is equal to "Y % M".

The adder 224 adds the output from the multiplier 223 and the output from the logical AND circuit 222, to output the result to the adder 225.

The arithmetic shift circuit 231 receives X (X coordinate value of the head data) and $\log_2 N$ output from the storage unit 214. The arithmetic shift circuit 231 arithmetically shifts X to the right by $\log_2 N$ digits, to output the result to the arithmetic shift circuit 232.

The arithmetic shift circuit 232 receives $\log_2 M$ output from the storage unit 213 and the output from the arithmetic shift circuit 231. The arithmetic shift circuit 232 arithmetically shifts the output from the arithmetic shift circuit 231 to the left by $\log_2 M$ digits, to output the result to the adder 225.

The adder 225 adds the output from the adder 224 and the output from the arithmetic shift circuit 232, to output the result to the adder 226 and the adder 233.

The adder 226 adds the output from the adder 225 and the base address BASE to output the result. The output from the adder 226 is the local address A1.

The adder 233 adds the output from the adder 225 and M output from the storage unit 215, to output the result to the adder 234.

The adder 234 adds the output from the adder 233 and the base address BASE to output the result. The output from the adder 234 is the local address A2.

The logical AND circuit 240 receives X and N1 from the storage unit 216, and performs logical AND operation for each bit on X and N1 with respect to the bit to output the result. The operation executed by the logical AND circuit 240 is equal to "X % N". In summary, the output from the logical AND circuit 240 is the threshold number Z.

The calculations performed by the calculation circuit 201 can be shown by the following expressions (4)-(6).

$$A1 = \text{BASEADDRESS} + (Y \!>\!> \log_2 M) \times Q + Y \& M1 + (X \!>\!> \log_2 N) \!<\!< \log_2 M \quad (4)$$

$$A2 = \text{BASEADDRESS} + (Y \!>\!> \log_2 M) \times Q + Y \& M1 + (X \!>\!> \log_2 N) \!<\!< \log_2 M + M \quad (5)$$

$$Z = X \& N1 \quad (6)$$

The calculations shown by these expressions are equal to the calculations shown by the expressions (1)-(3).

In this way, in the SIMD processor according to the second embodiment of the present invention, the PE number N is limited to a power of 2, and the number of rows M of a block is also limited to a power of 2. Further, the SIMD processor performs calculations by the address calculation unit 200. Therefore, it is possible to reduce the number of times that multiplication and division are performed to calculate the local address A1, the local address A2, and the threshold number Z. As a result, it is possible to reduce the cost for achieving the circuit and to suppress overhead to calculate the local address A1 and the like.

Third Embodiment

Figure 5:
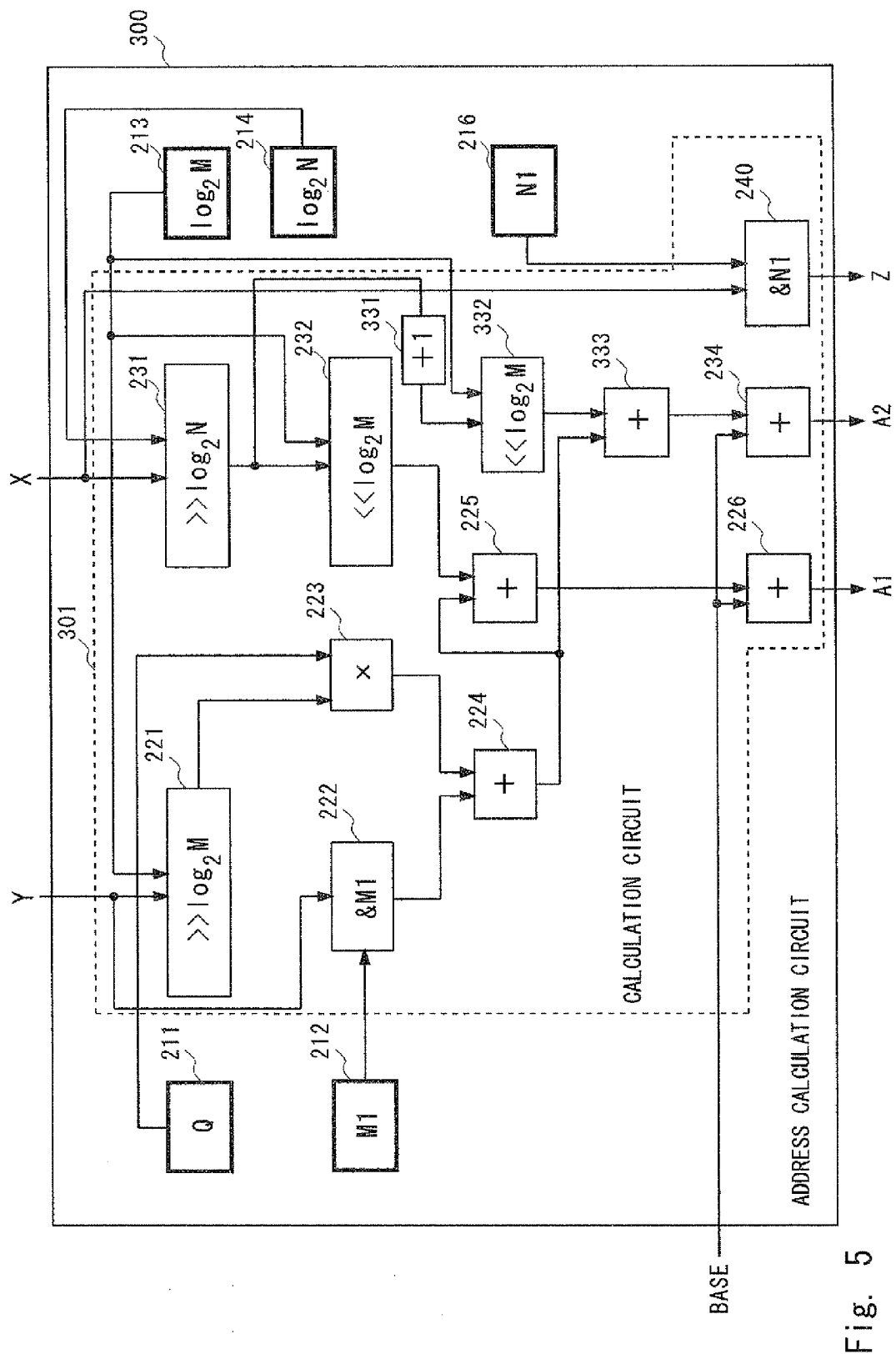
FIG. 5 is a diagram showing an address calculation unit in a SIMD processor according to a third embodiment of the present invention.

A third embodiment of the present invention is a SIMD processor including an address calculation unit 300 shown in FIG. 5 in place of the address calculation unit 200 in the SIMD processor according to the second embodiment.

As shown in FIG. 5, the address calculation unit 300 includes a calculation circuit 301, and a parameter storage unit other than the calculation circuit 301.

Comparing the address calculation unit 300 with the address calculation unit 200, the parameter storage unit in the address calculation unit 300 does not include the storage unit 215 that stores M. Further, the calculation circuit 301 includes an adder 331 that adds "1" to the output from the arithmetic shift circuit 231, and an arithmetic shift circuit 332 that arithmetically shifts the output from the adder 331 to the left by $\log_2 M$ digits. Further, the calculation circuit 301 includes an adder 333 that adds the output from the adder 224 and the output from the arithmetic shift circuit 332 in place of the adder 233.

The calculations performed by the calculation circuit 301 in the address calculation unit 300 can be expressed by expressions (4), (7), and (6). While the expressions (4) and (6) have already been stated above, they will be shown again for the sake of clarity.

$$A1 = \text{BASEADDRESS} + (Y \!\gg\! \log_2 M) \times Q + Y \& M1 + (X \!\gg\! \log_2 N) \!\ll\! \log_2 M \quad (4)$$

$$A2 = \text{BASEADDRESS} + (Y \!\gg\! \log_2 M) \times Q + Y \& M1 + ((X \!\gg\! \log_2 N) + 1) \!\ll\! \log_2 M \quad (7)$$

$$Z = X \& N1 \quad (6)$$

In short, the calculation circuit 301 performs the calculation of the expression (7) to calculate the local address A2 in place of the calculation of the expression (5) performed by the calculation circuit 201. Note that the calculations shown by the expressions (4), (7), and (6) are equal to the calculations shown by the expressions (1)-(3).

The SIMD processor according to the third embodiment including the address calculation unit 300 is also able to achieve the similar effect as the SIMD processor according to the second embodiment including the address calculation unit 200.

Fourth Embodiment

Figure 6:
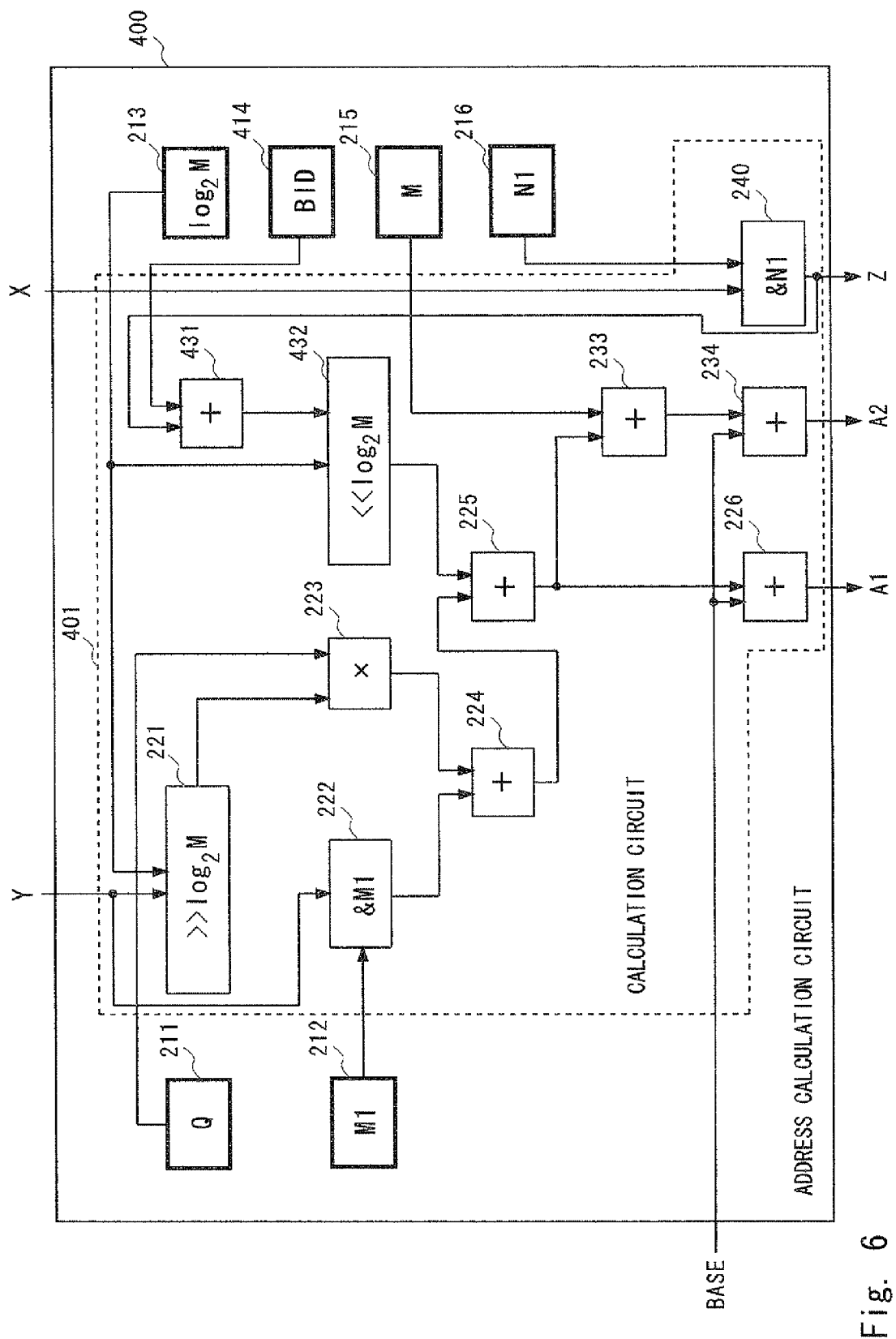
FIG. 6 is a diagram showing an address calculation unit in a SIMD processor according to a fourth embodiment of the present invention.

A fourth embodiment of the present invention is a SIMD processor including an address calculation unit 400 shown in FIG. 6 in place of the address calculation unit 200 in the SIMD processor according to the second embodiment.

As shown in FIG. 6, the address calculation unit 400 includes a calculation circuit 401, and a parameter storage unit other than the calculation circuit 401.

Comparing the address calculation unit 400 with the address calculation unit 200, a parameter storage unit in the address calculation unit 400 includes a storage unit 414 that stores BID in place of the storage unit 214 that stores $\log_2 N$. Note that BID is the number of the block where the head data among N pieces of data is located. Further, the calculation circuit 401 includes an adder 431 that adds the block number BID output from the storage unit 414 and the threshold number Z obtained by the logical AND circuit 240 in place of the arithmetic shift circuit 231. Further, an arithmetic shift circuit 432 provided in place of the arithmetic shift circuit 232 shifts the output from the adder 431 to the left by $\log_2 M$ digits, to output the result to the adder 225.

The calculations performed by the calculation circuit 401 in the address calculation unit 400 can be expressed by expressions (8)-(10).

$$Z = X \& N1 \quad (8)$$

$$A1 = \text{BASEADDRESS} + (Y \!\gg\! \log_2 M) \times Q + Y \& M1 + (BID + Z) \!\ll\! \log_2 M \quad (9)$$

$$A2 = \text{BASEADDRESS} + (Y \!\gg\! \log_2 M) \times Q + Y \& M1 + (BID + Z) \!\ll\! \log_2 M + M \quad (10)$$

The calculations shown by these expressions are equal to the calculations shown by the expressions (1)-(3).

The SIMD processor according to the fourth embodiment including the address calculation unit 400 is also able to achieve the similar effect as the SIMD processor according to the second embodiment including the address calculation unit 200.

Fifth Embodiment

Figure 7:
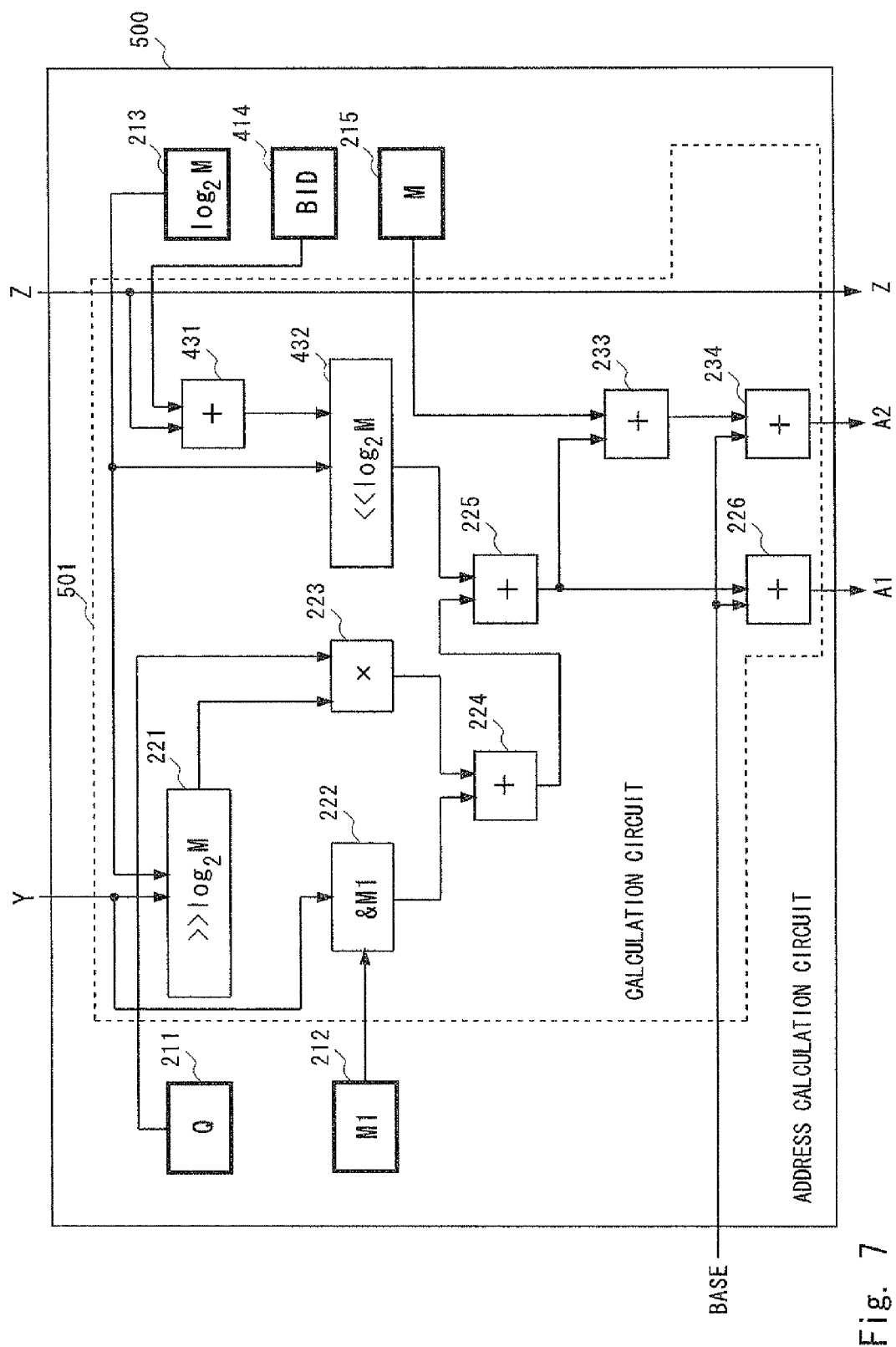
FIG. 7 is a diagram showing an address calculation unit in a SIMD processor according to a fifth embodiment of the present invention.

A fifth embodiment of the present invention is a SIMD processor including an address calculation unit 500 shown in FIG. 7 in place of the address calculation unit 400 in the SIMD processor according to the fourth embodiment.

As shown in FIG. 7, the address calculation unit 500 includes a calculation circuit 501, and a parameter storage unit other than the calculation circuit 501.

The address calculation unit 500 receives the threshold number Z, Y, and the base address BASE, as is different from the address calculation unit 400 that receives X, Y, and the base address BASE.

Compared with the address calculation unit 400, the parameter storage unit of the address calculation unit 500 is similar to the parameter storage unit of the address calculation unit 400 except that it does not include the storage unit 216 that stores N1 which is "N−1". Further, the calculation circuit 501 is similar to the calculation circuit 401 of the address calculation unit 400 except that it does not include the logical AND circuit 240 that calculates the threshold number Z from X and N1.

In summary, the threshold number Z is input from outside to the address calculation unit 500 in the SIMD processor according to the fifth embodiment, thereby being able to perform the similar calculations as in the address calculation unit 400 with smaller circuit size compared to the address calculation unit 400.

Sixth Embodiment

A sixth embodiment of the present invention is a SIMD processor including an address calculation circuit 600 in which the address calculation unit 300 shown in FIG. 5 and the address calculation unit 400 shown in FIG. 6 are combined.

Figure 8:
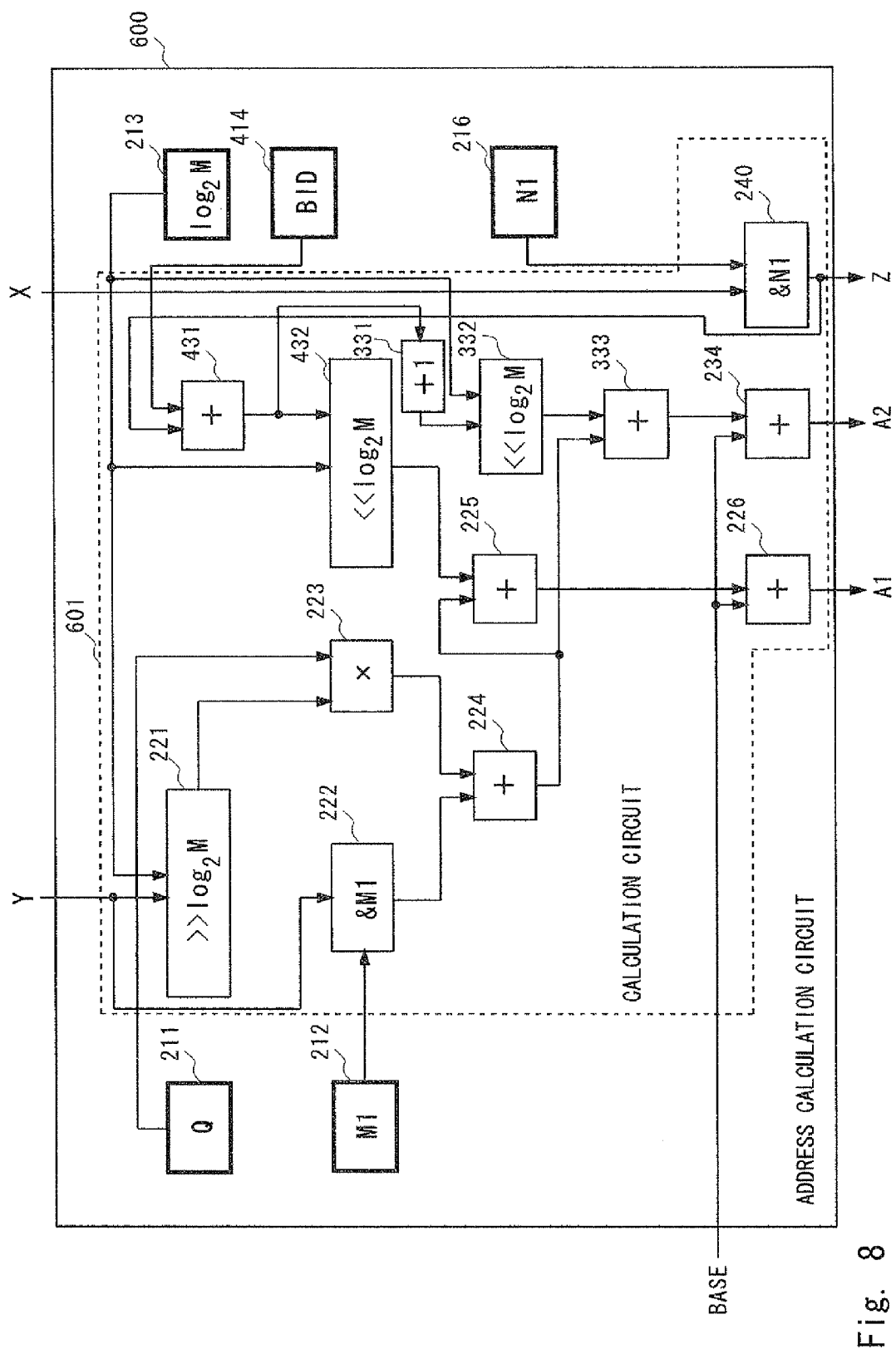
FIG. 8 is a diagram showing an address calculation unit in a SIMD processor according to a sixth embodiment of the present invention.

As shown in FIG. 8, the address calculation unit 600 includes a calculation circuit 601, and a parameter storage unit other than the calculation circuit 601.

As is similar to the parameter storage unit of the address calculation unit 300, the parameter storage unit of the address calculation circuit 600 does not include the storage unit 215 that stores M.

Further, as is similar to the parameter storage unit of the address calculation unit 400, the parameter storage unit of the address calculation circuit 600 includes a storage unit 414 that stores the block number BID in place of the storage unit 214.

Further, the calculation circuit 601 includes an adder 431 that adds the block number BID from the storage unit 414 and the threshold number Z obtained from the logical AND circuit 240. The arithmetic shift circuit 432 shifts the output from the adder 431 to the left by $\log_2 M$ digits, to output the result to the adder 225. Further, the calculation circuit 601 includes an adder 331 that adds "1" to the output from the adder 431, and an arithmetic shift circuit 332 that arithmetically shifts the output from the adder 331 to the left by $\log_2 M$ digits. Further, the calculation circuit 601 includes an adder 333 that adds the output from the adder 224 and the output from the arithmetic shift circuit 332 to output the result to the adder 234.

The calculations performed by the calculation circuit 601 can be shown in expressions (8), (9), and (11).

$$Z = X \& N1 \tag{8}$$

$$A1 = \text{BASEADDRESS} + (Y \gg \log_2 M) \times Q + Y \& M1 + (BID + Z) \ll \log_2 M \tag{9}$$

$$A2 = \text{BASEADDRESS} + (Y \gg \log_2 M) \times Q + Y \& M1 + (BID + Z + 1) \ll \log_2 M \tag{11}$$

The calculations shown by these expressions are also equal to the calculations shown by the expressions (1)-(3).

Seventh Embodiment

A seventh embodiment of the present invention is a SIMD processor including an address calculation circuit 700 in which the address calculation unit 500 shown in FIG. 7 and the address calculation unit 600 shown in FIG. 8 are combined.

Figure 9:
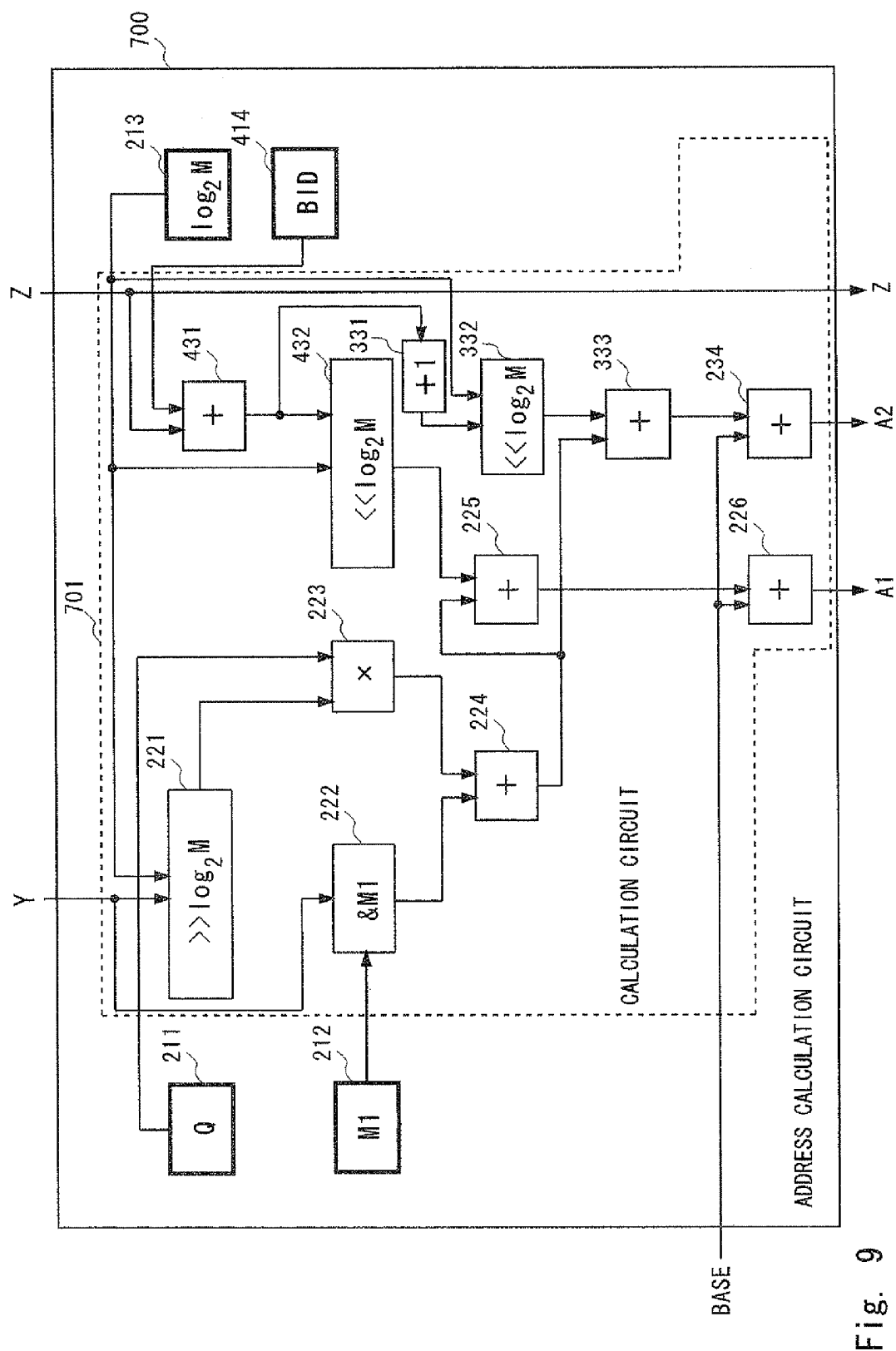
FIG. 9 is a diagram showing an address calculation unit in a SIMD processor according to a seventh embodiment of the present invention.
Figure 10:
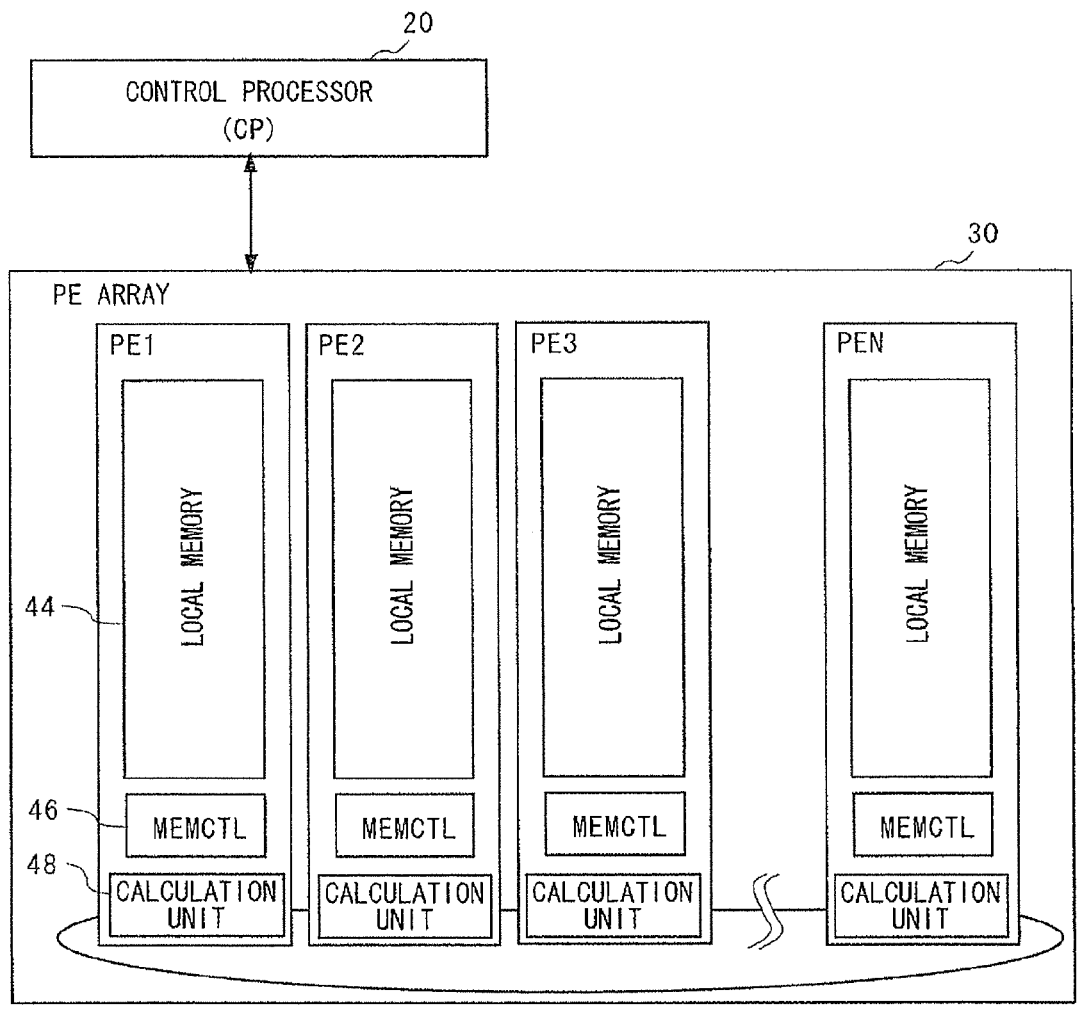
FIG. 10 is diagram schematically showing a SIMD processor disclosed in a non-patent literature 1.
Figure 11:
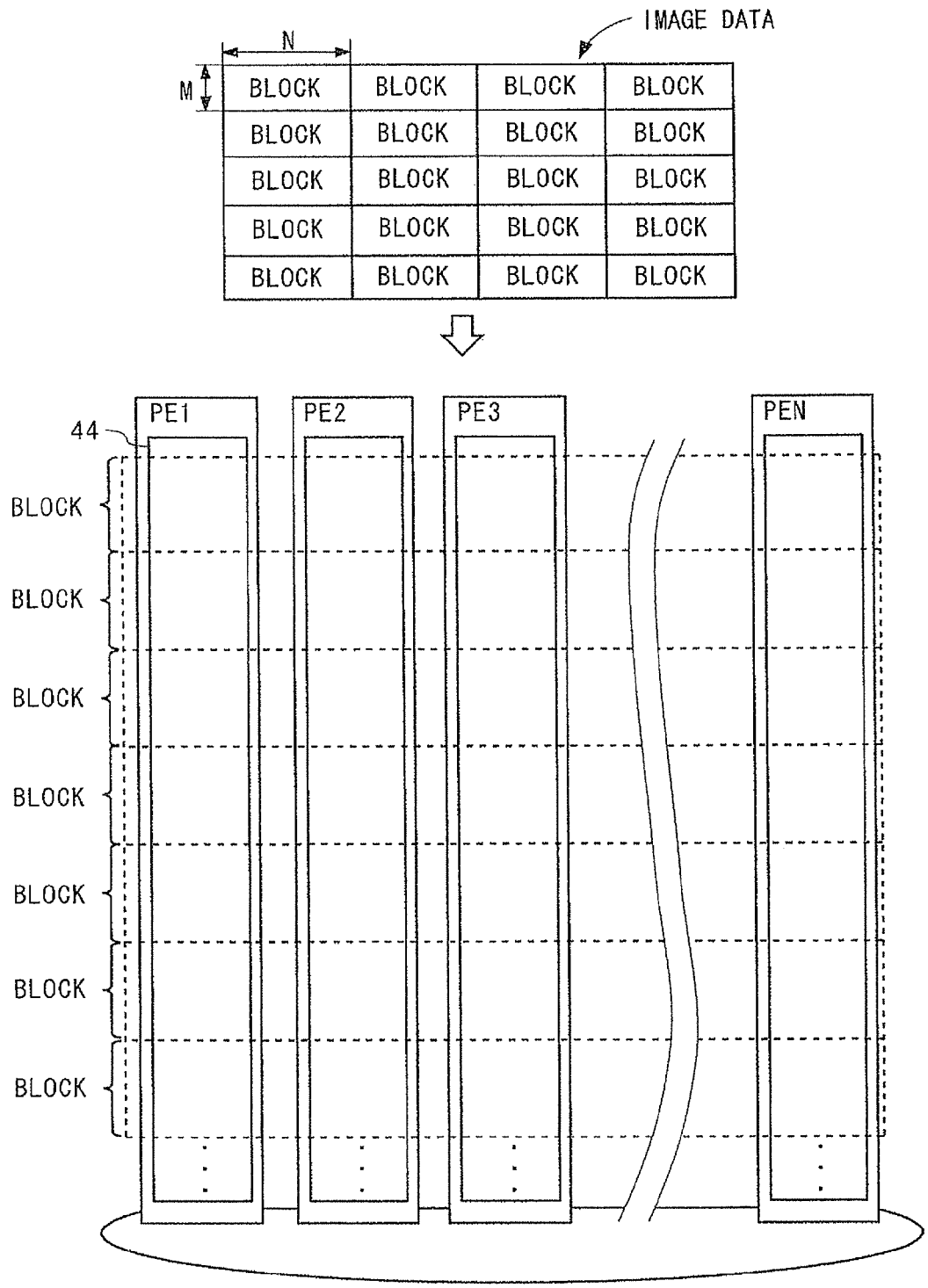
FIG. 11 is a diagram showing an aspect of storing image data to a local memory in the SIMS processor shown in FIG. 10.
Figure 12:
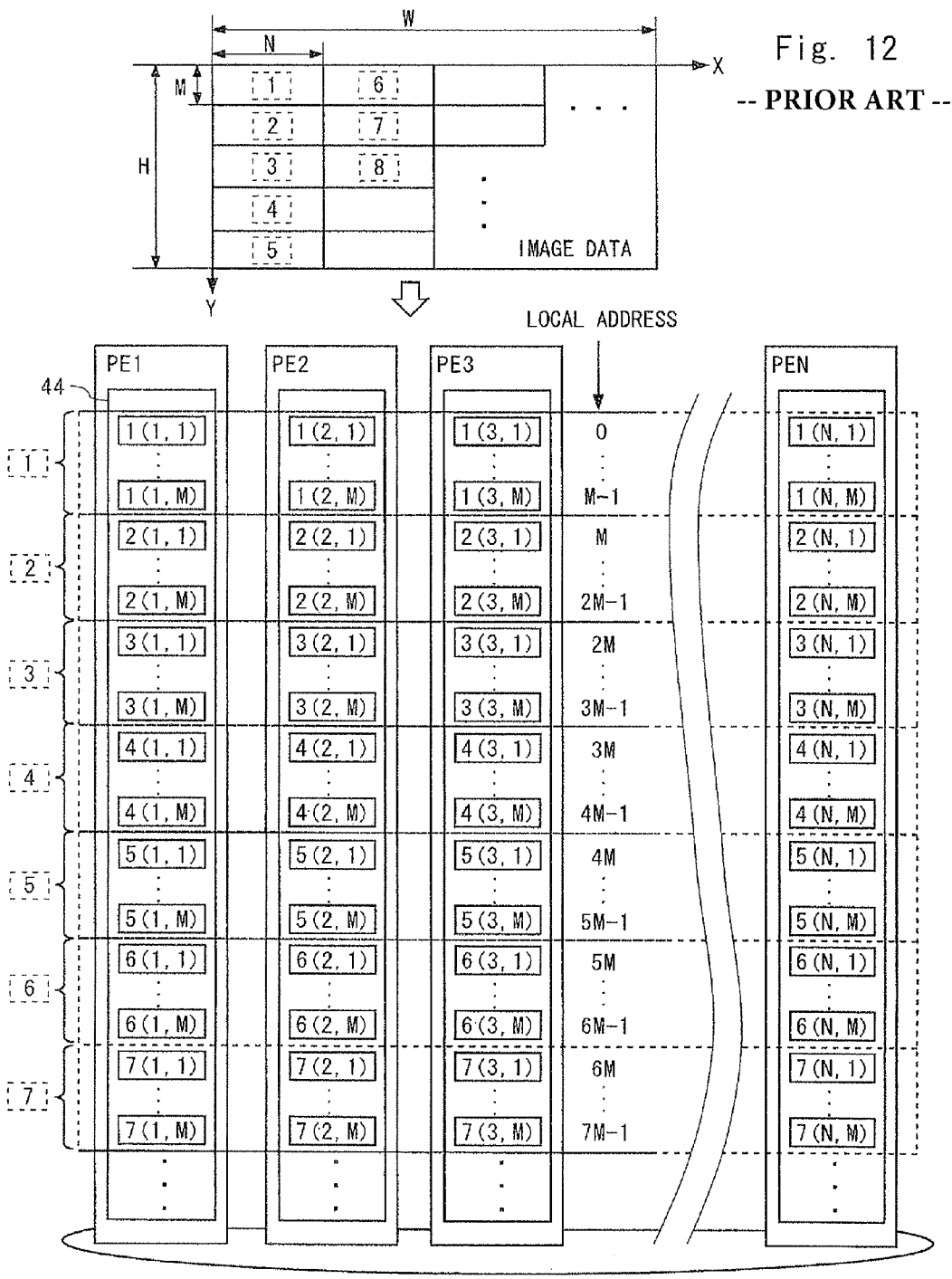
FIG. 12 is a diagram for describing a vertical direction priority method of the storage method shown in FIG. 11.
Figure 13:
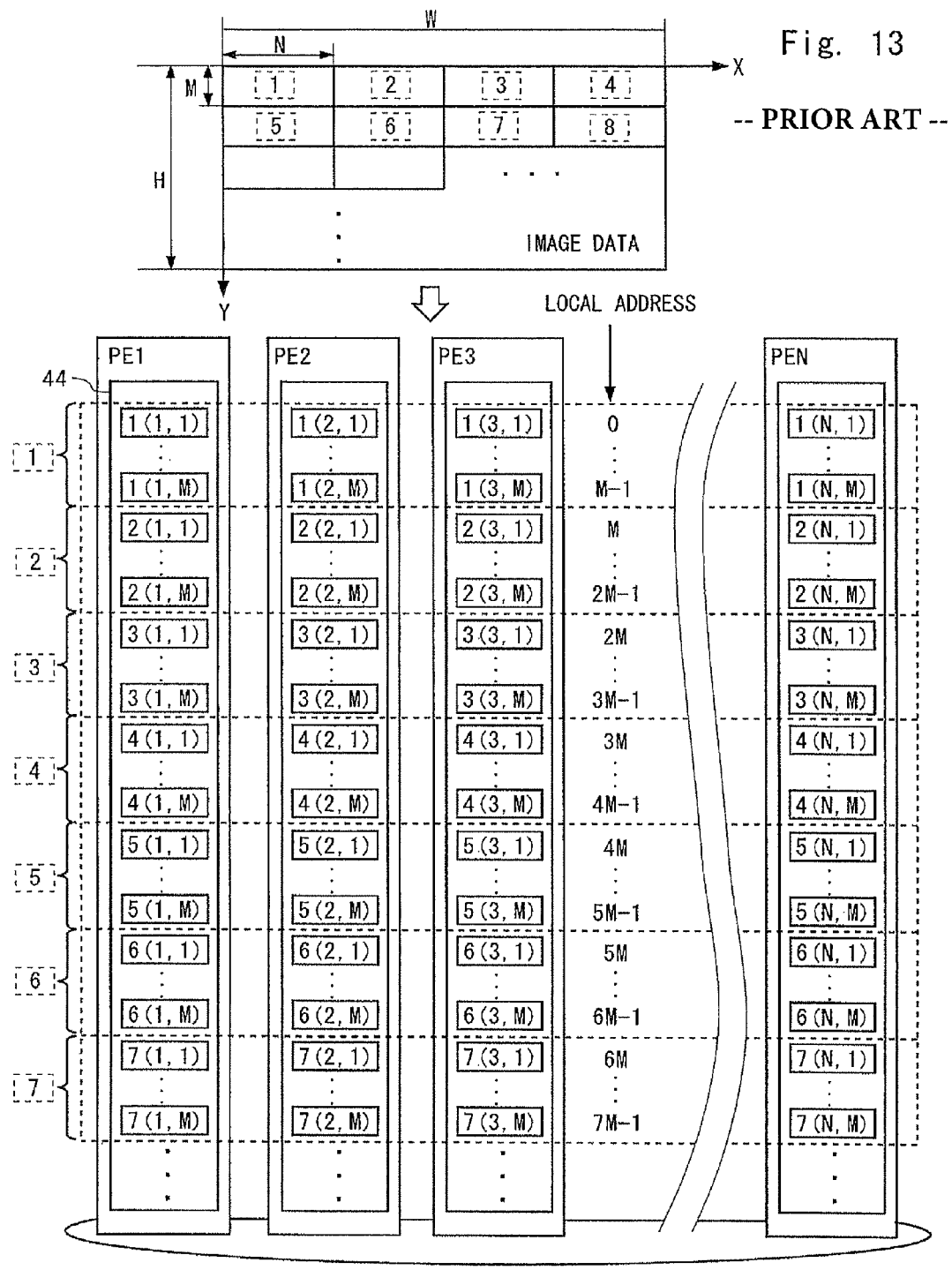
FIG. 13 is a diagram for describing a lateral direction priority method of the storage method shown in FIG. 11.

As shown in FIG. 9, the address calculation unit 700 includes a calculation circuit 701, and a parameter storage unit other than the calculation circuit 701. The address calculation circuit 700 receives the threshold number Z, Y, and the base address BASE as is similar to the address calculation unit 500.

Further, the parameter storage unit of the address calculation circuit 700 does not include the storage unit 216 that stores N1 and the storage unit 214 that stores $\log_2 N$, as is similar to the parameter storage unit of the address calculation unit 500, and includes a storage unit 414 that stores the block number BID.

Further, as is similar to the parameter storage unit of the address calculation unit 600, the parameter storage unit of the address calculation circuit 700 does not include the storage unit 215 that stores M.

In summary, in the address calculation circuit 700, the parameter storage unit only stores Q, M1, $\log_2 M$, and the block number BID.

Further, the calculation circuit 701 is similar to the calculation circuit 601 of the address calculation circuit 600 except that it does not include the logical AND circuit 240 that calculates the threshold number Z from X and N1.

In summary, the calculation circuit 701 executes the calculations shown by the expressions (9) and (11) above to obtain the local address A1 and the local address A2.

While the embodiments have been described above taking an image as an example, the technique according to the present invention may also be applied to a SIMD processor that processes two-dimensional data other than images.

While the invention has been described in terms of several embodiments, those skilled in the art will recognize that the invention can be practiced with various modifications within the spirit and scope of the appended claims and the invention is not limited to the examples described above.

Further, these embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A Single Instruction Multiple Data (SIMD) processor comprising:
N, wherein N is an integer of two or larger, pieces of processor elements which are connected in a ring shape and to which numbers are sequentially assigned, and a control processor which controls the N pieces of processor elements, two-dimensional data having a width of W, wherein W is an integral multiple of N, larger than N being divided into blocks, each block having a width of N and the number of rows of M, wherein M is an integer of one or larger, the SIMD processor transferring the two-dimensional data to local memories from an external memory in such a way that blocks located on an upper side are preferentially transferred, and N pieces of data in a same row in a same block are to be stored in a same local address of the respective local memories of the N pieces of processor elements, wherein the control processor comprises an address calculation unit that calculates a local address A1, a local address A2, and a threshold number Z based on X, Y, M, W, and N, the local address A1 and the local address A2 may be a local address of N pieces of data aligned in a row direction from head data having coordinate values in the two-dimensional data of (X,Y), the N pieces of data being stored in the local memories, and the threshold number Z being a threshold of the number of the processor element which serves as a standard to select any one of the two local addresses, when designating the local address of the N pieces of data to the N pieces of processor elements, the control processor broadcasts the local address A1, the local address A2, and the threshold number Z obtained from the address calculation unit to the N pieces of processor elements, and each of the N pieces of processor elements comprises an address selector that compares a magnitude relation of the threshold number Z with an identification number of the processor element and selects one of the local address A1 and the local address A2 according to the comparison result.

2. The SIMD processor according to claim 1, wherein the address calculation unit calculates each of the local address A1, the local address A2, and the threshold number Z according to expression (1), expression (2), and expression (3), when coordinate values of data in an upper-left end of the two-dimensional data is (0,0):

$$A1 = \text{BASEADDRESS} + \text{floor}(Y \div M) \times (M \times W \div N) + \text{floor}(X \div N) \times M + Y \% M \tag{1};$$

$$A2 = \text{BASEADDRESS} + \text{floor}(Y \div M) \times (M \times W \div N) + \text{floor}(X \div N) \times M + Y \% M + M \tag{2}; \text{ and}$$

$$Z = X \% N \tag{3},$$

where
BASEADDRESS is a base address;
X is an X direction coordinate value of the head data;
Y is a Y direction coordinate value of the head data;
N is the number of processor elements;
W is a width of the two-dimensional data; and
M is the number of rows of the block.

3. The SIMD processor according to claim 1, wherein each of the number of processor elements N and the number of rows M of the block is a power of 2, and the address calculation unit comprises:
a parameter storage unit that stores the M, M1 which is M−1, $\log_2 M$, Q which is $(W \gg \log 2N) \ll \log 2M$, N1 which is N−1, and $\log_2 N$; and a calculation circuit that performs calculation shown in expression (4), expression (5), and expression (6), using each parameter stored in the parameter storage unit to obtain the local address A1, the local address A2, and the threshold number Z:

$$A1 = \text{BASEADDRESS} + (Y \gg \log_2 M) \times Q + Y\&M1 + (X \gg \log_2 N) \ll \log_2 M \quad (4);$$

$$A2 = \text{BASEADDRESS} + (Y \gg \log_2 M) \times Q + Y\&M1 + (X \gg \log_2 N) \ll \log_2 M + M \quad (5); \text{ and}$$

$$Z = X\&N1 \quad (6),$$

where
BASEADDRESS is a base address;
X is an X direction coordinate value of the head data;
Y is a Y direction coordinate value of the head data;
N is the number of processor elements; and
M is the number of rows of the block.

4. The SIMD processor according to claim 1, wherein
each of the number of processor elements N and the number of rows M of the block is a power of 2, and
the address calculation unit comprises:
a parameter storage unit that stores the M, M1 which is M−1, $\log_2 M$, Q which is (W≫log 2N)≪log 2M, N1 which is N−1, and $\log_2 N$; and
a calculation circuit that performs calculation shown in expression (4), expression (7), and expression (6), using each parameter stored in the parameter storage unit to obtain the local address A1, the local address A2, and the threshold number Z:

$$A1 = \text{BASEADDRESS} + (Y \gg \log_2 M) \times Q + Y\&M1 + (X \gg \log_2 N) \ll \log_2 M \quad (4);$$

$$A2 = \text{BASEADDRESS} + (Y \gg \log_2 M) \times Q + Y\&M1 + (X \gg \log_2 N) \ll \log_2 M \quad (7); \text{ and}$$

$$Z = X\&N1 \quad (6),$$

where
BASEADDRESS is a base address;
X is an X direction coordinate value of the head data;
Y is a Y direction coordinate value of the head data;
N is the number of processor elements; and
M is the number of rows of the block.

5. The SIMD processor according to claim 1, wherein
each of the number of processor elements N and the number of rows M of the block is a power of 2, and
the address calculation unit comprises:
a parameter storage unit that stores the M, M1 which is M−1, $\log_2 M$, Q which is (W≫log 2N)≪log 2M, N1 which is N−1, and BID, which is a block number of the block where the head data is located; and
a calculation circuit that performs calculation shown in expression (8), expression (9), and expression (10), using each parameter stored in the parameter storage unit to obtain the local address A1, the local address A2, and the threshold number Z:

$$Z = X\&N1 \quad (8);$$

$$A1 = \text{BASEADDRESS} + (Y \gg \log_2 M) \times Q + Y\&M1 + (BID + Z) \ll \log_2 M \quad (9); \text{ and}$$

$$A2 = \text{BASEADDRESS} + (Y \gg \log_2 M) \times Q + Y\&M1 + (BID + Z) \ll \log_2 M + M \quad (10),$$

where
BASEADDRESS is a base address;
X is an X direction coordinate value of the head data;
Y is a Y direction coordinate value of the head data;
N is the number of processor elements; and
M is the number of rows of the block.

6. The SIMD processor according to claim 1, wherein
each of the number of processor elements N and the number of rows M of the block is a power of 2, and
the address calculation unit comprises:
a parameter storage unit that stores the M, M1 which is M−1, $\log_2 M$, Q which is (W≫log 2N)≪log 2M, N1 which is N−1, and BID, which is a block number of the block where the head data is located; and
a calculation circuit that performs calculation shown in expression (9) and expression (10), using each parameter stored in the parameter storage unit to obtain the local address A1, the local address A2, and the threshold number Z which is received from outside:

$$A1 = \text{BASEADDRESS} + (Y \gg \log_2 M) \times Q + Y\&M1 + (BID + Z) \ll \log_2 M \quad (9); \text{ and}$$

$$A2 = \text{BASEADDRESS} + (Y \gg \log_2 M) \times Q + Y\&M1 + (BID + Z) \ll \log_2 M + M \quad (10),$$

where
BASEADDRESS is a base address;
X is an X direction coordinate value of the head data;
Y is a Y direction coordinate value of the head data;
N is the number of processor elements; and
M is the number of rows of the block.

7. The SIMD processor according to claim 1, wherein
each of the number of processor elements N and the number of rows M of the block is a power of 2, and
the address calculation unit comprises:
a parameter storage unit that stores the M, M1 which is M−1, $\log_2 M$, Q which is (W≫log 2N)≪log 2M, N1 which is N−1, and BID, which is block number of the block where the head data is located; and
a calculation circuit that performs calculation shown in expression (8), expression (9), and expression (11), using each parameter stored in the parameter storage unit to obtain the local address A1, the local address A2, and the threshold number Z:

$$Z = X\&N1 \quad (8);$$

$$A1 = \text{BASEADDRESS} + (Y \gg \log_2 M) \times Q + Y\&M1 + (BID + Z) \ll \log_2 M \quad (9); \text{ and}$$

$$A2 = \text{BASEADDRESS} + (Y \gg \log_2 M) \times Q + Y\&M1 + (BID + Z + 1) \ll \log_2 M \quad (11),$$

where
BASEADDRESS is a base address;
X is an X direction coordinate value of the head data;
Y is a Y direction coordinate value of the head data;
N is the number of processor elements; and
M is the number of rows of the block.

8. The SIMD processor according to claim 1, wherein
each of the number of processor elements N and the number of rows M of the block is a power of 2, and
the address calculation unit comprises:
a parameter storage unit that stores the M, M1 which is M−1, $\log_2 M$, Q which is (W≫log 2N)≪log 2M, N1 which is N−1, and BID, which is block number of the block where the head data is located; and
a calculation circuit that performs calculation shown in expression (9) and expression (11), using each parameter stored in the parameter storage unit to obtain the local address A1, the local address A2, and the threshold numb Z which is received from outside:

$$A1 = \text{BASEADDRESS} + (Y \gg \log_2 M) \times Q + Y\&M1 + (BID + Z) \ll \log_2 M \quad (9); \text{ and}$$

$$A2 = \text{BASEADDRESS} + (Y \gg \log_2 M) \times Q + Y\&M1 + (BID + Z + 1) \ll \log_2 M \quad (11),$$

where
BASEADDRESS is a base address;
X is an X direction coordinate value of the head data;
Y is a Y direction coordinate value of the head data;
N is the number of processor elements; and
M is the number of rows of the block.

9. A control processor that controls N, wherein N is an integer of two or larger, pieces of processor elements in a Single Instruction Multiple Data (SIMD) processor comprising: N pieces of processor elements which are connected in a ring shape and to which numbers are sequentially assigned, two-dimensional data having a width of W, wherein W is an integral multiple of N, larger than N being divided into blocks, each block having a width of N and the number of rows of M, wherein M is an integer of one or larger, the SIMD processor transferring the two-dimensional data to local memories from an external memory in such a way that blocks located on an upper side are preferentially transferred, and N pieces of data in a same row in a same block are to be stored in a same local address of the respective local memories of the N pieces of processor elements, wherein the control processor comprises an address calculation unit that calculates a local address A1, a local address A2, and a threshold number Z based on X, Y, M, W, and N, the local address A1 and the local address A2 may be a local address of N pieces of data aligned in a row direction from head data having coordinate values in the two-dimensional data of (X,Y), the N pieces of data being stored in the local memories, and the threshold number Z being a threshold of the number of the processor element which serves as a standard to select any one of the two local addresses, and when designating the local address of the N pieces of data to the N pieces of processor elements, the control processor broadcasts the local address A1, the local address A2, and the threshold number Z obtained from the address calculation unit to the N pieces of processor elements.

10. The control processor according to claim 9, wherein the address calculation unit calculates each of the local address A1, the local address A2, and the threshold number Z according to expression (12), expression (13), and expression (14), when coordinate values of data in an upper-left end of the two-dimensional data is (0,0):

$$A1 = \text{BASEADDRESS} + \text{floor}(Y \div M) \times (M \times W \div N) + \text{floor}(X \div N) \times M + Y \% M \quad (12);$$

$$A2 = \text{BASEADDRESS} + \text{floor}(Y \div M) \times (M \times W \div N) + \text{floor}(X \div N) \times M + Y \% M + M \quad (13); \text{ and}$$

$$Z = X \% N \quad (14),$$

where
BASEADDRESS is a base address;
X is an X direction coordinate value of the head data;
Y is a Y direction coordinate value of the head data;
N is the number of processor elements;
W is a width of the two-dimensional data; and
M is the number of rows of the block.

11. The control processor according to claim 9, wherein each of the number of processor elements N and the number of rows M of the block is a power of 2, and
the address calculation unit comprises:
a parameter storage unit that stores the M, M1 which is M−1, $\log_2 M$, Q which is (W>>log 2N)<<log 2M, N1 which is N−1, and log N; and
a calculation circuit that performs calculations shown in expression (15), expression (16), and expression (17), using each parameter stored in the parameter storage unit to obtain the local address A1, the local address A2, and the threshold number Z:

$$A1 = \text{BASEADDRESS} + (Y >> \log_2 M) \times Q + Y\&M1 + (X >> \log_2 N) << \log_2 M \quad (15);$$

$$A2 = \text{BASEADDRESS} + (Y >> \log_2 M) \times Q + Y\&M1 + (X >> \log_2 N) << \log_2 M \quad (16); \text{ and}$$

$$Z = X\&N1 \quad (17),$$

where
BASEADDRESS is a base address,
X is an X direction coordinate value of the head data;
Y: Y is a Y direction coordinate value of the head data;
N: N is the number of processor elements; and
M: M is the number of rows of the block.

12. The control processor according to claim 9, wherein each of the number of processor elements N and the number of rows M of the block is a power of 2, and
the address calculation unit comprises:
a parameter storage unit that stores the M, M1 which is M−1, $\log_2 M$, Q which is (W>>log 2N)<<log 2M, N1 which is N−1, and $\log_2 N$; and
a calculation circuit that performs calculations shown in expression (15), expression (18), and expression (17), using each parameter stored in the parameter storage unit to obtain the local address A1, the local address A2, and the threshold number Z:

$$A1 = \text{BASEADDRESS} + (Y >> \log_2 M) \times Q + Y\&M1 + (X >> \log_2 N) << \log_2 M \quad (15);$$

$$A2 = \text{BASEADDRESS} + (Y >> \log_2 M) \times Q + Y\&M1 + (X >> \log_2 N) << \log_2 M \quad (18); \text{ and}$$

$$Z = X\&N1 \quad (17),$$

where
BASEADDRESS is a base address;
X is an X direction coordinate value of the head data;
Y: Y is a Y direction coordinate value of the head data;
N: N is the number of processor elements; and
M: M is the number of rows of the block.

13. The control processor according to claim 9, wherein each of the number of processor elements N and the number of rows M of the block is a power of 2, and
the address calculation unit comprises:
a parameter storage unit that stores the M, M1 which is M−1, log 2M, Q which is (W>>log 2N)<<log 2M, N1 which is N−1, and BID, which is a block number of the block where the head data is located; and
a calculation circuit that performs calculations shown in expression (19), expression (20), and expression (21), using each parameter stored in the parameter storage unit to obtain the local address A1, the local address A2, and the threshold number Z:

$$Z = X\&N1 \quad (19);$$

$$A1 = \text{BASEADDRESS} + (Y >> \log_2 M) \times Q + Y\&M1 + (BID + Z) << \log_2 M \quad (20); \text{ and}$$

$$A2 = \text{BASEADDRESS} + (Y >> \log_2 M) \times Q + Y\&M1 + (BID + Z) << \log_2 M + M \quad (21),$$

where
BASEADDRESS is a base address;
X is an X direction coordinate value of the head data;
Y: Y is a Y direction coordinate value of the head data;
N: N is the number of processor elements; and
M: M is the number of rows of the block.

14. The control processor according to claim 9, wherein each of the number of processor elements N and the number of rows M of the block is a power of 2, and the address calculation unit comprises:
 a parameter storage unit that stores the M, M1 which is M−1, $\log_2 M$, Q which is (W>>log 2N)<<log 2M, N1 which is N−1, and BID, which is a block number of the block where the head data is located; and
 a calculation circuit that performs calculations shown in expression (20) and expression (21), using each parameter stored in the parameter storage unit to obtain the local address A1, the local address A2, and the threshold number Z which is received from outside:

$$A1 = BASEADDRESS + (Y >> \log_2 M) \times Q + Y \& M1 + (BID + Z) << \log_2 M \quad (20); \text{ and}$$

$$A2 = BASEADDRESS + (Y >> \log_2 M) \times Q + Y \& M1 + (BID + Z) << \log_2 M + M \quad (21),$$

where
BASEADDRESS is a base address;
X is an X direction coordinate value of the head data;
Y: Y is a Y direction coordinate value of the head data;
N: N is the number of processor elements; and
M: M is the number of rows of the block.

15. The control processor according to claim 9, wherein each of the number of processor elements N and the number of rows M of the block is a power of 2, and the address calculation unit comprises:
 a parameter storage unit that stores the M, M1 which is M−1, $\log_2 M$, Q which as (W>>log 2N)<<log 2M, N1 which is N−1, and BID, which is a block number of the block where the head data is located; and
 a calculation circuit that performs calculations shown in expression (19), expression (20), and expression (22), using each parameter stored in the parameter storage unit to obtain the local address A1, the local address A2, and the threshold number Z:

$$Z = X \& N1 \quad (19);$$

$$A1 = BASEADDRESS + (Y >> \log_2 M) \times Q + Y \& M1 + (BID + Z) << \log_2 M \quad (20); \text{ and}$$

$$A2 = BASEADDRESS + (Y >> \log_2 M) \times Q + Y \& M1 + (BID + Z+1) << \log_2 M \quad (22),$$

where
BASEADDRESS is a base address;
X is an X direction coordinate value of the head data;
Y: Y is a Y direction coordinate value of the head data;
N: N is the number of processor elements; and
M: M is the number of rows of the block.

16. The control processor according to claim 9, wherein each of the number of processor elements N and the number of row M of the block is power of 2, and the address calculation unit comprises:
 a parameter storage unit that stores the M, M1 which is M−1, $\log_2 M$, Q which is (W>>log 2N)<<log 2M, N1 which is N−1, and BID, which is a block number of the block where the head data is located; and
 a calculation circuit that performs calculations shown in expression (20) and expression (22), using each parameter stored in the parameter storage unit to obtain the local address A1, the local address A2, and the threshold number Z which is received from outside:

$$A1 = BASEADDRESS + (Y >> \log_2 M) \times Q + Y \& M1 + (BID + Z) << \log_2 M \quad (20); \text{ and}$$

$$A2 = BASEADDRESS + (Y >> \log_2 M) \times Q + Y \& M1 + (BID + Z+1) << \log_2 M \quad (22),$$

where
BASEADDRESS is a base address;
X is an X direction coordinate value of the head data;
Y: Y is a V direction coordinate value of the head data;
N: N is the number of processor elements; and
M: M is the number of rows of the block.

* * * * *